United States Patent [19]
Elwood

[11] 3,839,719
[45] Oct. 1, 1974

[54] RADIO TRANSMITTING STATION

[76] Inventor: Albert A. Elwood, P.O. Box 10592, Riviera Beach, Fla. 33404

[22] Filed: Oct. 4, 1971

[21] Appl. No.: 186,136

Related U.S. Application Data

[63] Continuation-in-part of Ser. No. 833,638, June 16, 1969, Pat. No. 3,613,095.

[52] U.S. Cl............................................. 343/112 D
[51] Int. Cl............................................. G01s 11/00
[58] Field of Search................................. 343/112 D

[56] References Cited
UNITED STATES PATENTS

| | | | |
|---|---|---|---|
| 3,045,234 | 7/1962 | Sandretto........................ | 343/112 D |
| 3,167,772 | 1/1965 | Bagnall, Jr. et al............. | 343/112 D |
| 3,254,341 | 5/1966 | Broussaud....................... | 343/112 D |
| 3,325,811 | 6/1967 | Earp................................ | 343/112 D |
| 3,337,872 | 8/1967 | Earp................................ | 343/112 |

*Primary Examiner*—Richard A. Farley
*Assistant Examiner*—Richard E. Berger
*Attorney, Agent, or Firm*—Baldwin, Wight & Brown

[57] ABSTRACT

A method of and system for locating a position in which a plurality of frequency standard devices based on the action of the natural frequencies associated with transitions between energy states in atoms and/or molecules are synchronized or phase compared at the same initial location. Two of three frequency standard devices, in a two-dimensional embodiment, are placed at transmitting stations on a known baseline. The third device is at a third station, a receiving station, which receives signals from the two transmitting stations. At each transmitting station, means are provided for producing and transmitting a radio frequency carrier signal of fixed frequency and of fixed phase under the control of the frequency standard device associated with the respective station. The radio frequency carrier signals produced at the different transmitting stations differ in frequency. The radio frequency carrier signal produced at each transmitting station is modulated with a modulating signal produced under the control of the same frequency standard device which controls the means which produce the radio frequency carrier. At the receiving station, means are provided for producing a reference signal corresponding to the modulating signal and two radio frequency signals corresponding, in frequency, to the radio frequency carrier signals transmitted, the means at the receiving station being controlled by the frequency standard device associated with the receiving station. The reference signal is compared at the receiving station with the modulating signals recovered from the radio frequency carriers to determine respective time differences, the differences representing coarse position data from which the total number of phase rotations (full lanes) the receiving station is from each of the transmitting stations are determined. The phase relationships between each of the received radio frequency carrier signals and the respective one of the two radio frequency signals produced at the receiving station are determined, the relationships representing fine position data which are measurements of the receiving station position within a given phase rotation (lane). Methods and systems for locating a position in three dimensions are also described. The fine ranges, distances within given lanes, are respectively added by a computer to respective coarse ranges, each of which represents the total number of lanes to the full lane closest to respective ones of the transmitting stations, the totals being the distances between the receiving station and each of the transmitting stations.

14 Claims, 23 Drawing Figures

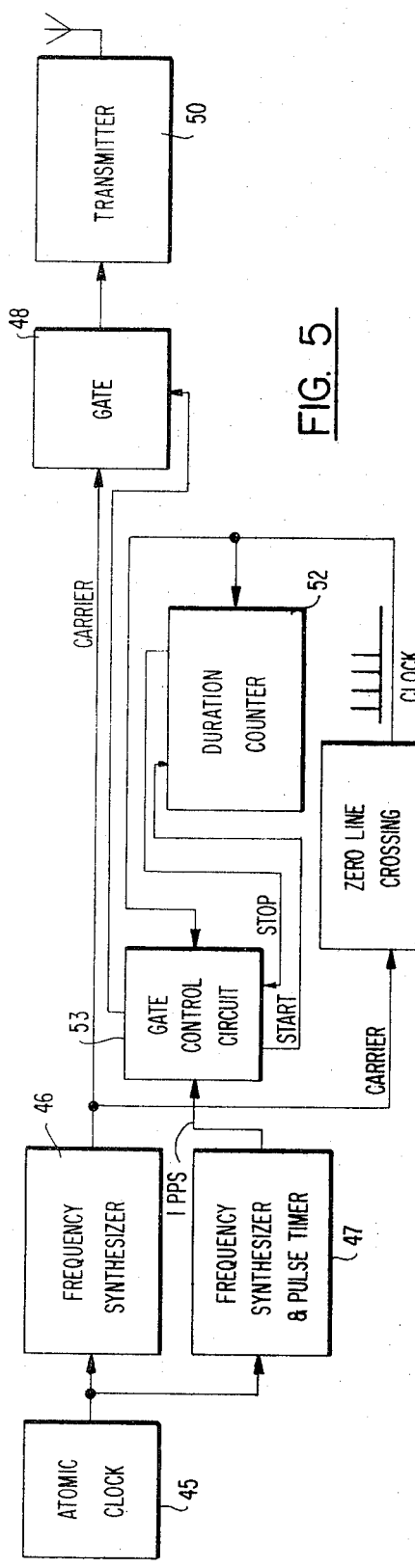
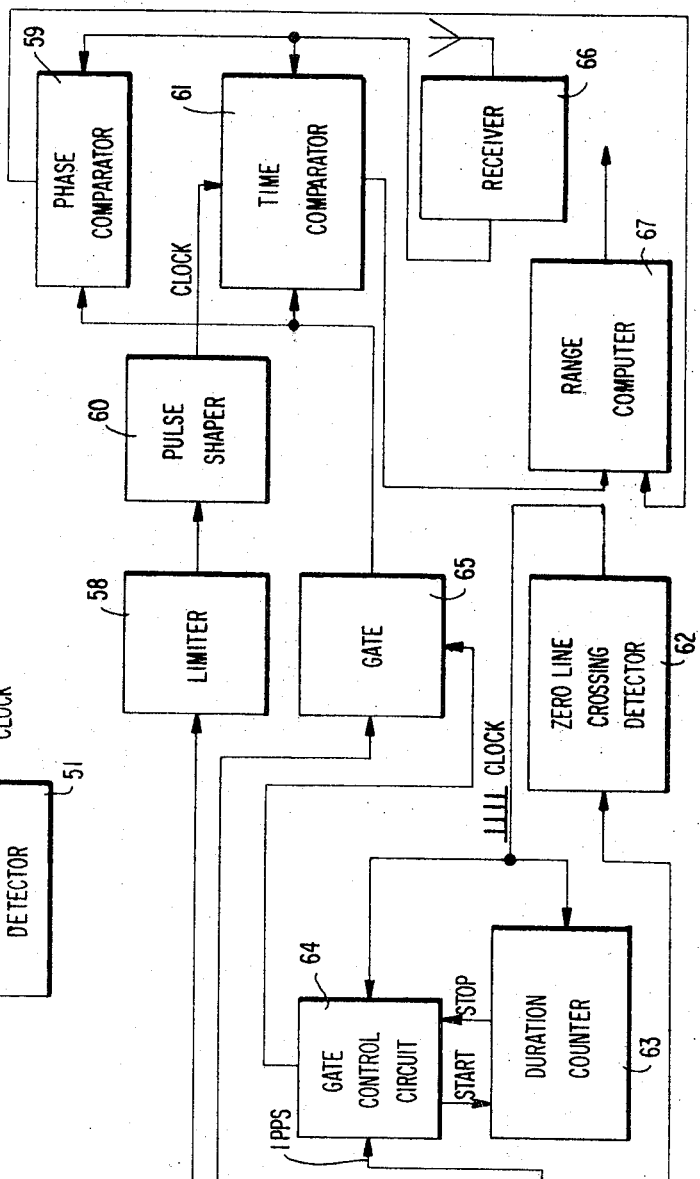
FIG. 5
FIG. 6

RADIO TRANSMITTING STATION

This application is a continuation-in-part application of my co-pending application Ser. No. 833,638 filed June 16, 1969, entitled "Method of and Apparatus for Locating a Position", now U.S Pat. No. 3,613,095.

BACKGROUND OF THE INVENTION

1. Field of the Invention

This invention relates, in general, to a transmitting station. In particular, the invention relates to a transmitting station particularly suitable for use in a method and system for accurately locating a specific position.

Although both the method and the system are of general utility they are especially useful in offshore oil surveys where it is important that a specific location be accurately and precisely identified. In an operation such as an offshore oil survey two transmitting stations would be land-based whereas a receiving station would be located on an offshore vessel which can be moved to an exact location which is being sought.

2. Description of the Prior Art

Many phase or time comparison systems have been developed for locating a position and are in use today. There are those based on the radar principle in which an echo or return of signal technique is used; there are those based on the use of transponders where receipt and retransmission of a signal are utilized; and there are those based on the Loran principal where time difference in the receipt of two transmitted pulses define a hyperbolic line of position.

SUMMARY OF THE INVENTION

Due to the high stability of atomic clocks, which are accurate on the order of one part in $10^{12}$ or $10^{13}$, no continuous synchronization between stations is required once the initial synchronization among three atomic clocks is performed or the initial phase/time relationships among the three atomic clocks are established.

The frequency of an atomic clock is determined by atomic particle or molecular vibrations and thereby remains constant. Its accuracy is about 100 to 1000 times as great as that of the quartz clock in which the vibration frequency changes in the course of time. Due to the constancy of the frequency of an atomic clock a new and novel system of position locating has been discovered.

Coarse range is defined as the total number of phase rotations at the carrier frequency (wave lengths) over the distance between each transmitting station and the receiving station, measured to the nearest full phase rotation in a direction along the transmitting station radials toward each transmitting station. Full phase rotations (wave lengths) or even fractions thereof may be further defined as lanes.

Fine range is defined as the position of the receiving station within a given phase rotation, or lane, measured in a direction along the transmitting station radials toward each transmitting station.

Coarse and fine ranges are combined in a computer to determine the distance to each transmitting station from the receiving station. Because of this, the system may be defined as a range-range system. The computer further may convert the ranges into position with respect to any grid or geographic reference that may be desired.

It is the principal object of the invention to provide a transmitting station which includes a transmitter supplied with a radio frequency signal from means controlled by a source of oscillations which also controls a modulating means.

It is another object of the invention to provide a transmitting station useful in a method of and a system for locating a position.

A method of and a system are disclosed for locating a position in which frequency standard devices at transmitter locations are used to produce radio frequency carrier waves which are phase compared with signals produced at a receiving station, under the control of a frequency standard device, to provide fine position data, and modulation signals, under the control of the frequency standard devices at the transmitter locations, are placed on the radio frequency carriers, recovered at the receiving station and compared with corresponding signals produced at the receiving station, under the control of the frequency standard device at the receiving station, to provide coarse position data.

A method of and a system are disclosed for position locating in which atomic clocks or the like are utilized to provide modulated constant frequency signals having constant known absolute phase relationships with one another; the received signals are then converted into distance data by determining the phase differences of the constant frequency signals and differential positions of recovered modulation signals using a plurality of signals from an atomic clock.

A position locating system is disclosed in which no continuous synchronization between stations is required once initial synchronization is performed or phase relationships among atomic clocks established.

A position locating method and system are disclosed in which the signal transmissions are single path and do not require an echo and/or retransmission.

A position locating system is disclosed in which atomic clocks or the like are utilized to provide a plurality of signals having known phase relationships with one another and a plurality of pulse or frequency change signals having known time or phase relationships with one another to develop respectively fine and coarse position information.

A method of and a system are disclosed for locating a position in three dimensions using three transmitting stations, controlled by frequency standard devices, and a receiving station which also uses a frequency standard device to provide signals for comparison with signals received from the transmitting stations.

A method of and a system are disclosed for locating a position in three dimensions using three transmitting stations, controlled by frequency standard devices, and a receiving station which also uses a frequency standard device to provide signals for comparison with signals received from the transmitting stations, at least one of the transmitting stations being carried by a satellite.

Further features, objects, and advantages will either be specifically pointed out or become apparent when, for a better understanding of the invention, reference is made to the following written description taken in conjunction with the accompanying drawings.

BRIEF DESCRIPTION OF THE DRAWINGS

FIG. 1C is a diagrammatic pictorial view illustrating the use of a method and system, in a three-dimensional arrangement, in which two transmitting stations are used in conjunction with an altimeter which can be carried on an aircraft or the like;

FIG. 5 is a block diagram of an illustrative embodiment of a notch modulated transmitting station according to the invention;

FIG. 6 is a simplified illustrative block diagram of a portion of a receiving station usable in conjunction with notch modulated transmitting stations of the type illustrated in FIG. 5;

DESCRIPTION OF PREFERRED EMBODIMENTS

Figure 1A:
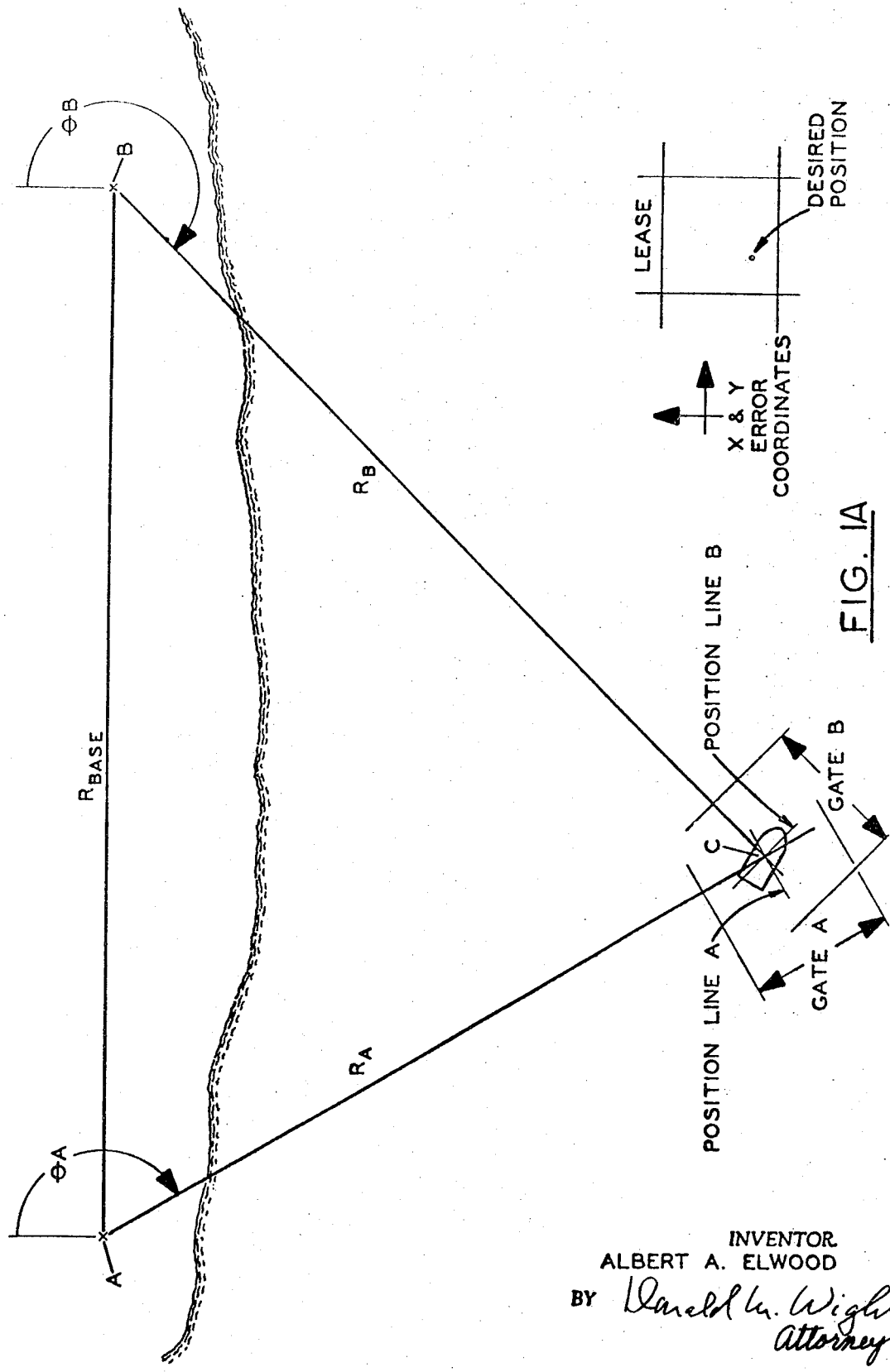
FIG. 1A is a diagrammatic view illustrating the use of a method and system, in a two-dimensional arrangement.

Referring now to FIG. 1A of the drawings, a system for locating a position will include a transmitting station A which is placed at a known position, a transmitting station B which is placed at a known position, with A and B placed on a known baseline $R_{base}$, and receiving station C which is at an unknown position and becomes the measured or located position.

Figure 1B:
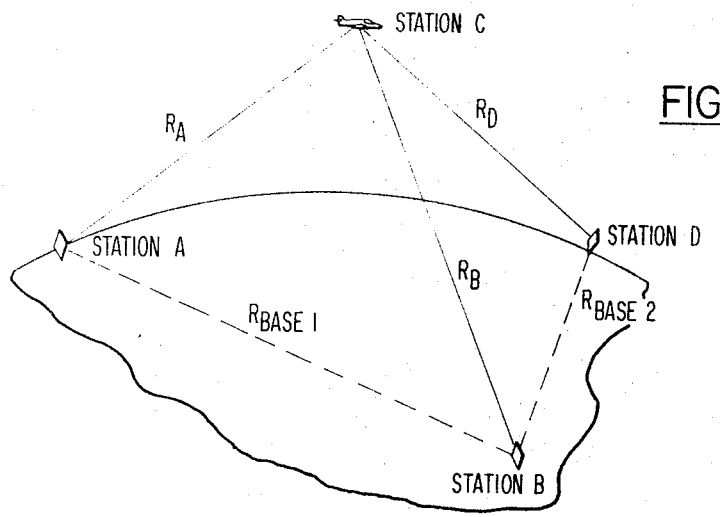
FIG. 1B is a diagrammatic pictorial view illustrating the use of a method and system, in a three-dimensional arrangement, in which three transmitting stations are used.

As illustrated in FIG. 1B, a three-dimensional system for locating a position may include a transmitting station A, a transmitting station B and a transmitting station D each placed at a respective location, spaced from one another. Stations A and B are placed on a known baseline $R_{base\ 1}$ and stations B and D are placed on a known baseline $R_{base\ 2}$. A receiving station C, illustrated as being carried by a moving aircraft, is at an unknown position and becomes the measured or located position.

Figure 1C:
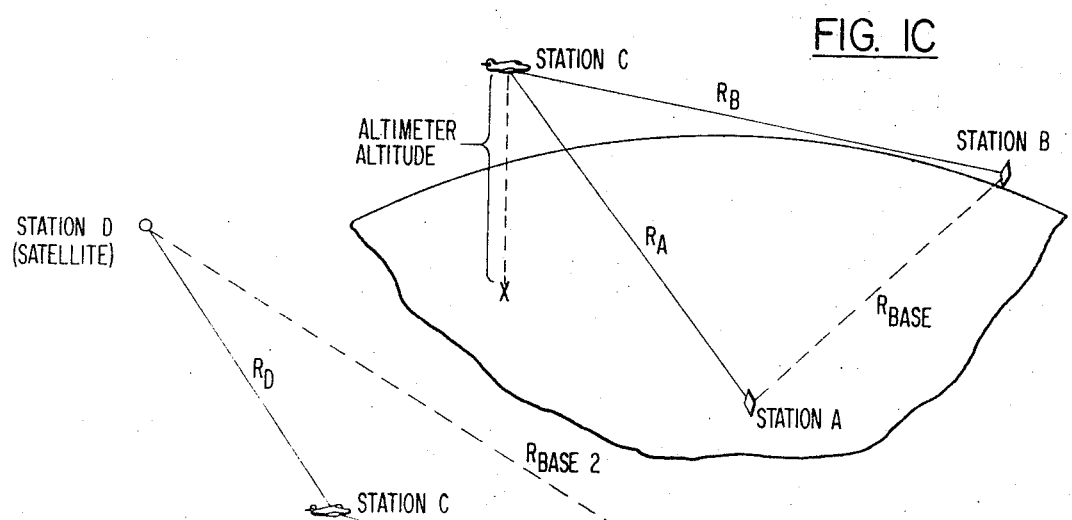

As shown in FIG. 1C, a three-dimensional system for locating a position may comprise a transmitting station A which is placed at a known position, a transmitting station B which is placed at a known position, stations A and B being positioned on a known base line $R_{base}$, and a receiving station C shown as being carried by a moving aircraft which is at an unknown position. The aircraft carries as part of its equipment an altimeter.

Figure 1D:
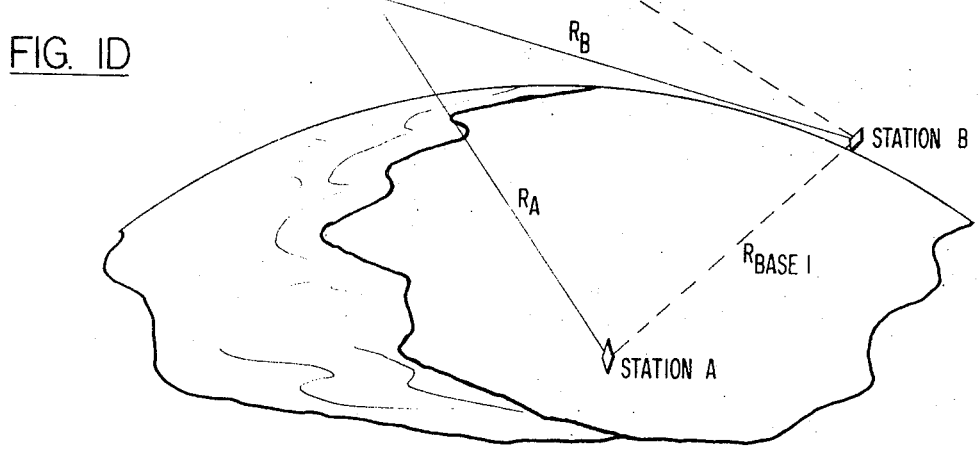
FIG. 1D is a diagrammatic pictorial view illustrating the use of a method and system, in a three-dimensional arrangement, in which three transmitting stations are used, one of them being carried by a satellite.

As illustrated in FIG. 1D, a further three-dimensional system for locating a position may include a transmitting station A, a transmitting station B and a transmitting station D each positioned at respective locations, spaced apart from one another, Stations A and B are placed on a known fixed baseline $R_{base\ 1}$ and stations B and D are placed on a known baseline $R_{base\ 2}$. As illustrated, station D is carried by a satellite which may be either a synchronized satellite or an unsynchronized satellite having a predictable orbit and known position at a given time. A receiving station C, illustrated as being carried by a moving aircraft, is at an unknown position and becomes the measured or located position.

Figure 2:
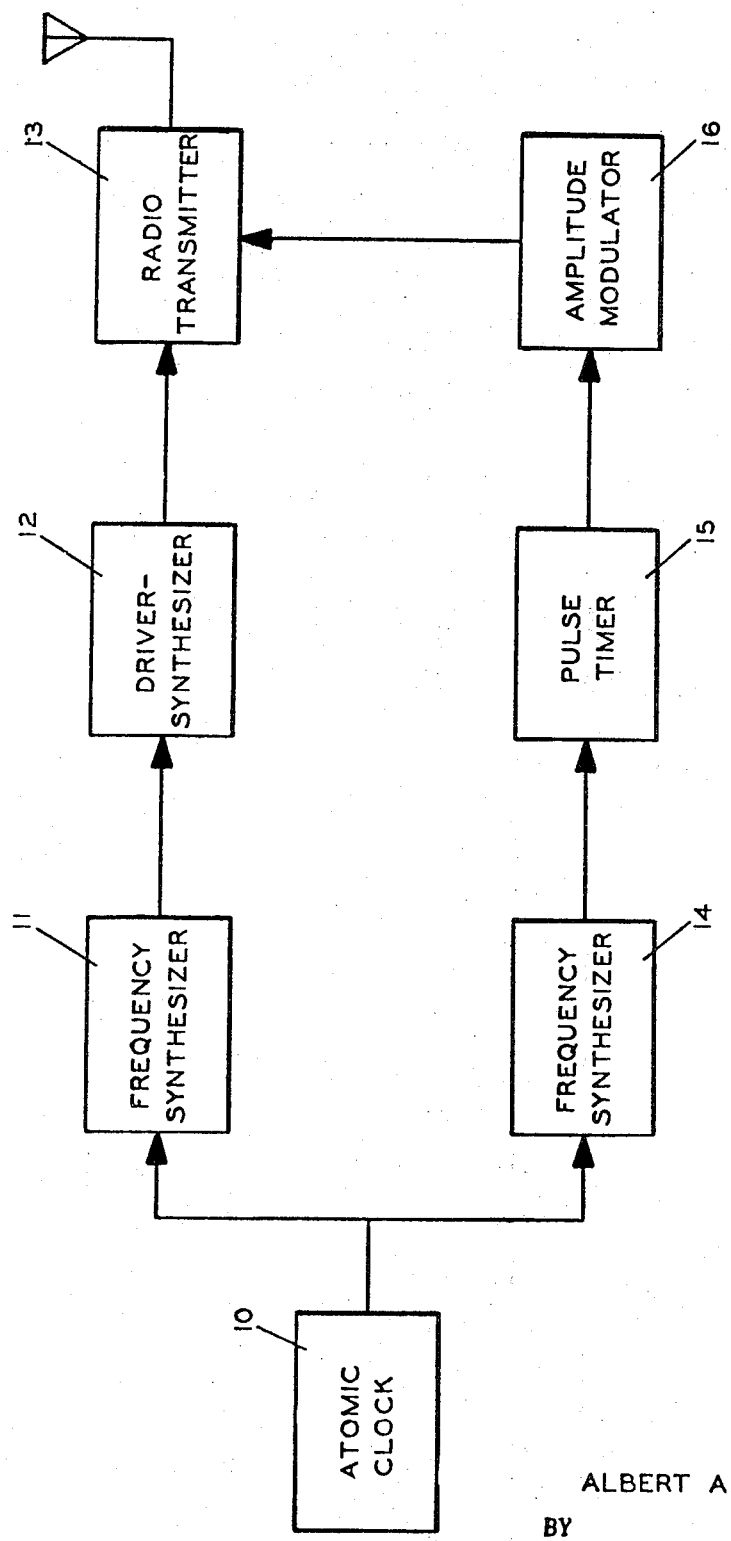
FIG. 2 is a block diagram of an illustrative embodiment of one of the transmitting stations according to the invention.

The two transmitting stations illustrated here as shore-based stations A and B (FIGS. 1A and 1C) and transmitting stations A, B and D (FIGS. 1B and 1D) are illustrated in greater detail in FIG. 2. The station shown is duplicated at A and B or A, B and D with the only essential difference being that different RF frequencies are transmitted from respective stations.

An atomic clock 10 provides a high frequency signal, for example 9 GHz, which is utilized in two ways. The high frequency signal is fed to frequency synthesizer 11 where it is reduced in frequency to a selected frequency in a range suitable for transmission over distances of up to about 100 miles, in an exemplary system, and for accuracy of phase determination. The range may be, for example, from about 1.0 to about 5.0

MH$_z$. The frequency synthesizer 11 converts the high frequency signal, from clock 10 to one in the lower range (1.0 – 5.0 MH$_z$) while maintaining the stability of the primary standard from clock 10. The output of frequency synthesizer 11 which is extremely accurate in its phase and frequency characteristics is fed to driver synthesizer 12 wherein it is amplified to a level sufficient to drive highly stable radio transmitter 13. The radio transmitter 13 is provided with an antenna from which a radio frequency signal of given frequency within the selected range and of precise phase and frequency is transmitted. Thus, the stability and accuracy of clock 10 is preserved and reflected in the radiated signal.

The high frequency signal from clock 10 is also fed to a frequency synthesizer 14 wherein it is converted to a given signal in the above-mentioned suitable lower range, for example from about 1.0 MH$_z$ to about 5.0 MH$_z$. Frequency synthesizer 14, like synthesizer 11, preserves the accuracy and stability of clock 10 and reflects the accuracy thereof in its own output which is coupled, as a synchronizing signal, to time format generator or pulse timer 15. Pulse timer 15 produces a train of pulses which are very accurately positioned with respect to one another. The pulses may be positioned, for example, at 10 second intervals.

The pulses from pulse timer 15 are fed to amplitude modulator 16 which, in turn, is arranged to modulate transmitter 13. It will be appreciated that other types of modulation could be used. For example, frequency shift keying could be provided, notch modulation could be used, and in some applications, a tone signal could be used to modulate transmitter 13 in either amplitude or frequency.

The modulations appearing on carrier signals from transmitting stations A, B and D (FIGS. 1B and 1D) or A and B (FIGS. 1A and 1C) are utilized at a moving receiving station C (FIGS. 1A–1D) to produce coarse position information data, and the phase relationships of the radio frequency signals from the transmitting stations are utilized to produce fine position information.

Figure 3:
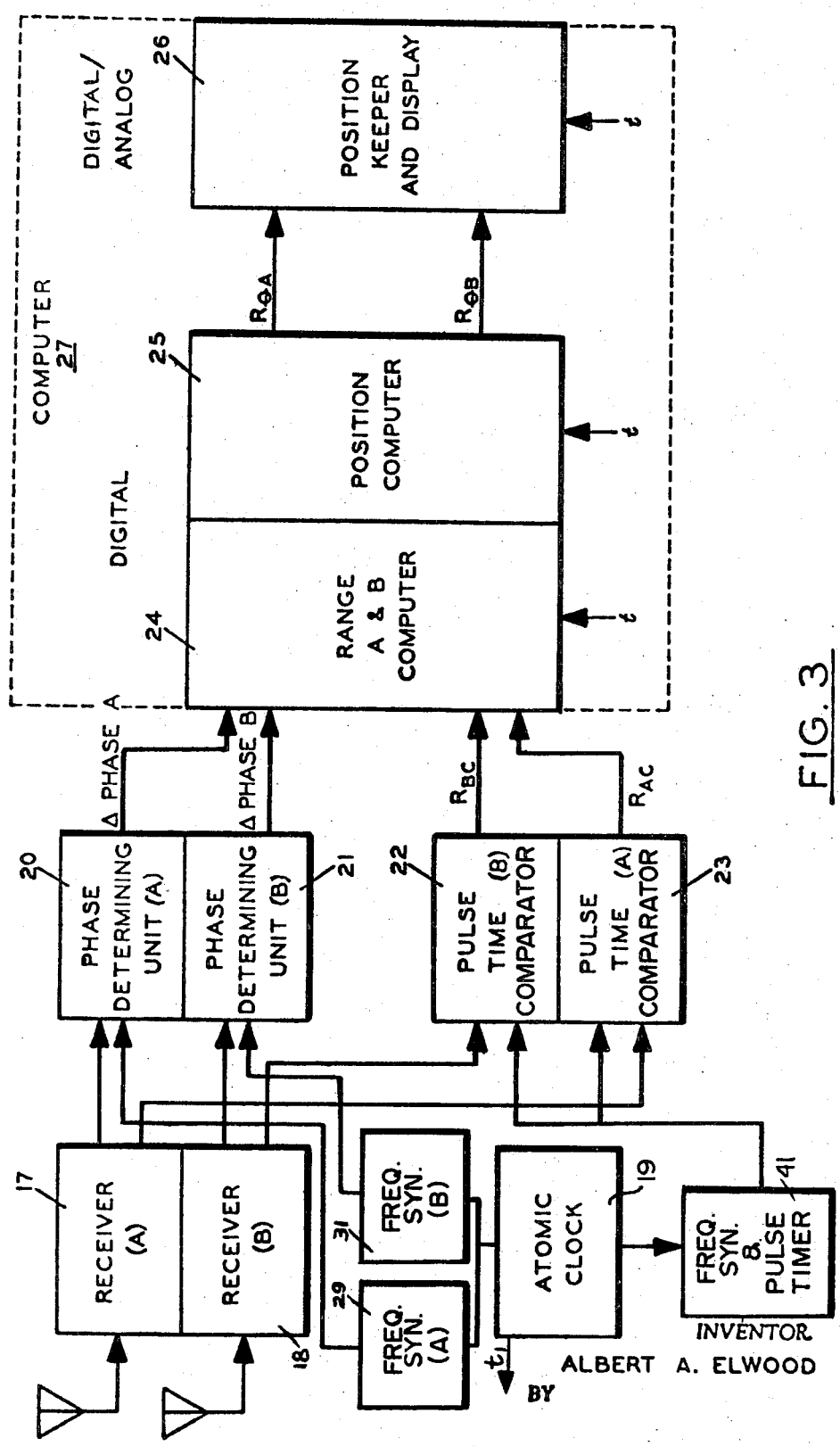
FIG. 3 is a block diagram of an illustrative embodiment of one of the receiving stations of the system.

The signal from radio transmitter 13 at station A (FIG. 1A) is received by the receiver 17 (FIG. 3) while the signal from radio transmitter 13 at station B (FIG. 1A) is received by the receiver 18 (FIG. 3). Radio frequency output signals from receivers 17 and 18 are fed to phase determining units 20 and 21, respectively, each of which compares the phase of respective radio frequency signals with the phase of the radio frequency signals from frequency synthesizers 29 and 31 which have their respective inputs coupled to atomic clock 19. The phase differences translated into digital signals, Δ phase A and Δ phase B, representative of phase difference are fed into the range computer 24 of the computer section 27 of the system and converted into two range signals indicating fine position information within a particular lane which may, for example, be 720 feet wide. Each degree of relative phase rotation in the example represents 2 feet. Of course, the outputs of phase determining units 20 and 21 do not provide lane identification.

Each of the receivers 17 and 18 is provided with amplitude demodulators, not shown, which develop pulse signals which are fed to pulse time comparators 23 and 22, respectively. Each of pulse timers 22 and 23 compares the time of occurrence of each of the pulse signals with the time of occurrence of pulses in a train of pulses fed to each pulse time comparator 22 and 23 from frequency synthesizer and pulse timer 41 which has its input coupled to the atomic clock 19. The pulse time comparators provide output coarse range digital signals $R_{BC}$ and $R_{AC}$ which are also fed into range computer 24, the output of which is coupled to computer 25 which provides output signals $R \ominus _A$ and $R \ominus _B$ representing the accurate distance station C is from each of the stations A and B, as illustrated in FIG. 1A.

The position computer 25 operates the position keeper and display 26 which converts the two ranges from shore stations A and B into precision position in any selected coordinate system. Signals $R \ominus _A$ and $R \ominus _B$ may be either digital or analog signals and the position keeper and display may be either digital or analog or both. The atomic clock 19 is provided with a timing output signal $t_1$ which is used to synchronize computer 27 as illustrated generally by timing inputs t which are provided by count-down circuits, not shown, which are driven by timing signal $t_1$. Alternatively, timing signal $t_1$ could be directly fed into the computer 27 provided that computer 27 contained suitable count-down circuits.

Figure 4:
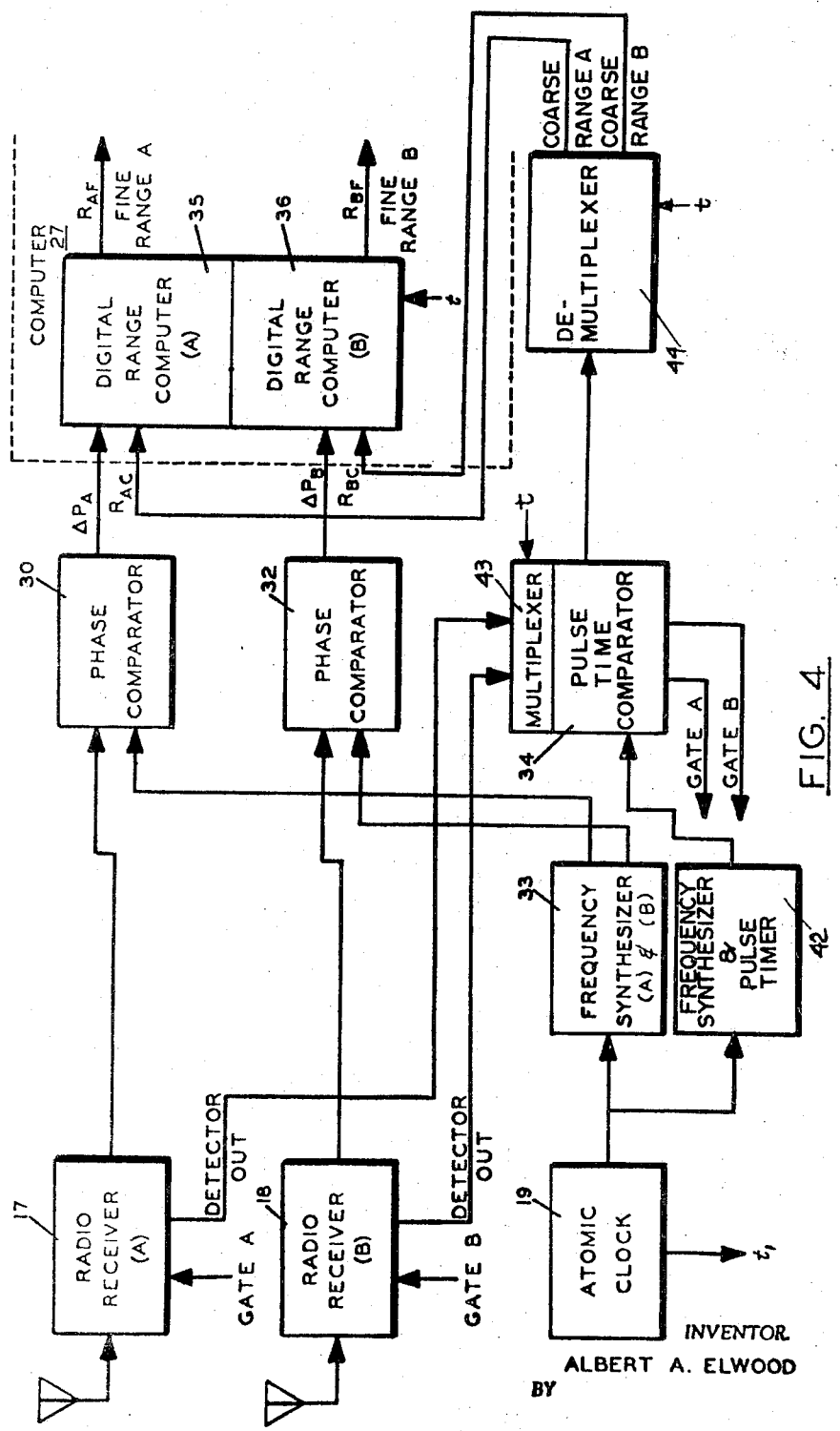
FIG. 4 is a block diagram in greater detail of part of a typical receiving station; the two sheets of the drawing containing FIG. 4 are to be placed end-to-end to illustrate a complete station including a computer.
Figure 4:
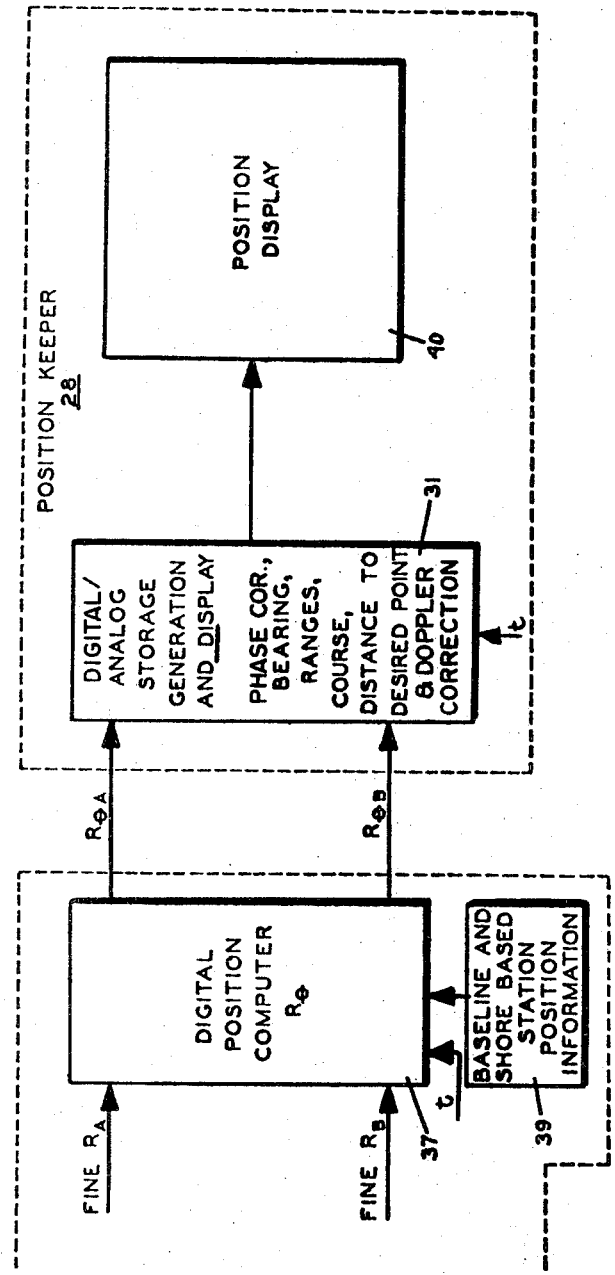

FIG. 4 illustrates in greater detail the instrumentation used in the offshore station when the system is being used to locate an offshore position.

Phase determining unit 20 of FIG. 3 is shown, in FIG. 4, as comprised of a phase comparator 30. Phase determining unit 21 of FIG. 3 is shown in FIG. 4 as comprised of a phase comparator 32.

Frequency synthesizers 33 shown in FIG. 4 correspond to frequency synthesizers 29 and 31 shown in FIG. 3 and frequency synthesizer and pulse timer 42 correspond to frequency synthesizer and pulse timer 41 shown in FIG. 3.

In the embodiment illustrated in FIG. 4, the function of the two pulse time comparators 22 and 23 illustrated in FIG. 3 is performed by a single pulse time comparator 34 which has its pulse inputs from receivers 17 and 18 and provided via a multiplexer 43, and its outputs representative of coarse ranges A and B data fed to computer 27 via de-multiplexer 44.

Digital outputs from phase comparators 30 and 32 are fed respectively to digital range computers 35 and 36 as fine position data, while outputs from pulse time comparator 34 are fed respectively to digital range computers 35 and 36 as coarse position data.

The two digital range computers 35 and 36 process their respective data inputs to provide output signals representing the fine (accurate) range of station C from stations A and B respectively.

The outputs from digital range computers 35 and 36 are fed to digital position computer 37 associated with data storage apparatus 39 which provides baseline and shore base station information. Using stored information from apparatus 39, digital position computer 37 translates the fine (accurate) position data supplied from range computers 35 and 36 into position signals $R \ominus _A$ and $R \ominus _B$ which are fed to digital/analog storage generation and display device 31, the output of which is fed to position display 40.

Device 31 is provided with storage means which contains phase correction data reflecting the initial absolute phase differences between three atomic clocks. Additional stored information, as desired, may be provided or developed within member 31 such as bearing, range, course, and known distance to the desired position within an offshore lease, for example, as shown in FIG. 1A. In some applications, such as a fast moving station C, Doppler correction data could be developed or stored within device 31. In the embodiment illustrated in FIG. 4, atomic clock 19 provides a timing output signal $t_1$ which is used to develop, in circuitry not illustrated, timing signals generally designated t which synchronize computer 27, position keeper 28, multiplexers 43 and de-multiplexer 44. Pulse time comparator 34 is provided with two gating outputs A and B which are used to gate radio receivers 17 and 18.

While the foregoing discussion is concerned principally with description of the method and system of the invention and its operation in a two-dimensional arrangement, it will be clear that the invention may be applied equally well in three-dimensional arrangements. It is suitable, for example, for locating the position of an aircraft or other object which moves in three dimensions. FIGS. 1B, 1C and 1D show three exemplary three-dimensional arrangements.

Referring to FIG. 1B, a three-dimensional system according to the method and system may include a transmitting station A, a transmitting station B and a transmitting station D each placed at a known position and spaced from one another. A receiving station C, carried by an aircraft, is at an unknown position and becomes the measured or located position in three dimensions. The three transmitting stations A, B and D (FIG. 1B) may be constructed as the transmitting station illustrated in FIG. 2, the only essential difference among the transmitting stations A, B and D being that different RF frequencies are transmitted from respective transmitting stations. In the case of a rapidly moving aircraft (FIG. 1B), each of the transmitting stations A, B and D is desirably provided with pulse timer 15 (FIG. 2) which produces pulses having a pulse repetition rate of 10-pulses-per-second, a higher rate than the one-pulse-every-ten-seconds rate used for locating a slow moving survey ship (FIG. 1A) or a one-pulse-per-second rate suitable for locating fast moving ships. As illustrated in FIG. 1B, the receiving station C is carried by an aircraft. The receiving station C (FIG. 1B) may be constructed similarly, for example, to either the receiving station shown in FIG. 3 or the receiving station shown in FIG. 4, it being understood, in either case, that an additional radio receiver suitable for receiving signals from the transmitting station D would be provided at receiving station C as well as instrumentalities for developing Δ phase D and $R_{DC}$ signals which would be fed to the computer 27 in addition to the Δ phase A, Δ phase B, $R_{AC}$ and $R_{BC}$ signals. The frequency synthesizer and pulse timer 41 (FIG. 3) or 42 (FIG. 4) would, of course, produce pulses having the same repetition rate as the pulses produced by the pulse timer 15.

In FIG. 1C, a three-dimensional system for locating the position according to the invention may include a transmitting station A, which is placed at a known position, a transmitting station B, which is placed at a known position, with stations A and B being on a known baseline $R_{base}$, and a receiving station C, illustrated as being carried by an aircraft which is at an unknown position and becomes the located or measured position. In the arrangement shown in FIG. 1C, the two transmitting stations A and B may be constructed as the transmitting station illustrated in FIG. 2 and the receiving station C may be constructed, for example, similarly to either the receiving station shown in FIG. 3 or the receiving station shown in FIG. 4. In the system illustrated in FIG. 1C, however, the receiving station C, which is carried by the aircraft, includes an altimeter (not shown) of known construction which develops height data which is fed to the computer 27 (FIGS. 3 and 4) thereby enabling the computer 27 to determine the position of station C in three dimensions, the computer 27 being capable of determining distances $R_A$ and $R_B$ in accordance with the system as shown in FIG. 1A.

Turning now to FIG. 1D, a three-dimensional system similar to that shown in FIG. 1B is shown, the only essential difference being that transmitting station D is carried by a satellite. The satellite may be either a synchronous satellite or a non-synchronous satellite. If the satellite is synchronous, its position is fixed relative to transmitting stations A and B (FIG. 1D) and the system operates identically to the system shown in FIG. 1B. If the satellite is non-synchronous, its position is constantly changing relative to the positions of transmitting stations A and B (FIG. 1D) in a predetermined pattern. In the latter case, the computer 27 (FIGS. 3 and 4) is provided with a data store which supplies a signal indicative of the instantaneous position of the non-synchronous satellite at any given time. Thus, the computer 27 (FIGS. 3 and 4) may determine from signals representative of Δ phase A, Δ phase B, Δ phase D, $R_{AC}$, $R_{BC}$, $R_{DC}$, as in FIG. 1B, and the signal representing the instantaneous position of the non-synchronous satellite, the position of receiving station C. In case the satellite is non-synchronous, it is desirable to provide that the transmitting stations A, B and D be provided with the transmitter shown in FIG. 2 with its pulse timer 15 arranged to produce pulses at a repetition rate of about 100-pulses-per-second a somewhat lower rate of about 10-pulses-per-second being appropriate when the satellite is of the synchronous type. Of course, the receiving station C csrried by an aircraft (FIG. 1D) would be provided with a frequency synthesizer and pulse timer 41 (FIG. 3) or 42 (FIG. 4) which produces pulses having the same repetition rate as the repetition rate of the pulses produced by the pulse timer 15 (FIG. 2).

The foregoing description, particularly as it relates to FIGS. 2, 3 and 4, involves by way of example periodic amplitude modulation of the radio frequency signals at each transmitting station. As thus far described, pulses are used to modulate the radio frequency signals. The modulating pulses, for the sake of accuracy, should have steep and well defined leading edges. In this circumstance, a relatively large bandwidth is required.

It will be appreciated that any one of a number of other forms of modulation or carrier perturbation may be used in practicing the invention.

Instead of periodically amplitude modulating the radio frequency carriers with pulses, in some instances the carriers could be modulated with a sine wave. In this instance, the sine wave should have a wave length at least as great as the distance over which operation is desired. If sine wave modulation were used, phase comparison techniques could be used to develop coarse position data at the receiving station.

Rather than amplitude modulating the radio frequency carriers, the carriers may be pulsed, each of the transmitting stations A and B or A, B and D broadcasting radio frequency pulses, the leading edges of which may represent coarse position data. The radio frequency pulses should be of sufficient width to enable the phase of each carrier wave to be determined at the receiving station C in the event fine position data is required. The duty cycle may be very low, i.e. the modulation event, pulsing each of the transmitters A and B or A, B and D on, may take place for a few microseconds or even a few nanoseconds once every second, half second, or 10 seconds, for example, when the receiving station C is carried by a ship. Higher pulse repetition rates are desirable in the event the receiving station C is carried by an aircraft (FIGS. 1B–1D) and/or transmitting station D is carried by an unsynchronized satellite (FIG. 1D). A pulse repetition rate of about 10-pulses-per-second would be suitable for systems using an aircraft for carrying the receiving station C (FIGS. 1B–1D). A pulse repetition rate of about 100-pulses-per-second would be appropriate for systems using an unsynchronized satellite for carrying transmitting station D (FIG. 1D).

Among other possible advantageous types of modulation which may be used to develop coarse position data in practicing the invention are notch modulation and frequency shift keying, both types requiring relatively narrow band widths and nevertheless assuring accurate and proper determination of coarse range.

Referring now to FIG. 5, a notch modulated transmitting station suitable for use as transmitting stations A and B (FIGS. 1A and 1C) or transmitting stations A, B and D (FIGS. 1B and 1D) in a system involving notch modulation techniques is illustrated.

The notch modulated transmitter of FIG. 5 includes an atomic clock 45, a cesium beam frequency standard which provides identical high frequency signals to a frequency synthesizer 46 and to a frequency synthesizer and pulse timer 47.

The frequency synthesizer 46 operates to reduce (divide) its high frequency input signal down to a desired carrier frequency, for example, down to a 3.12 MHz signal for one transmitting station.

A portion of the output from the frequency synthesizer 46 is fed continuously to a gate circuit 48 which is operative to switch on and off the carrier signal to a transmitter 50.

A portion of the radio frequency signal from the frequency synthesizer 46 is fed continuously to a zero line crossing detector 51 which produces a train of pulses, one pulse for each negative-to-positive zero line crossing of the radio frequency signal applied to its input.

The train of pulses from the zero line crossing detector 51 is supplied, as a clock input, to a duration counter 52 and as an input to a gate control circuit 53 which is operatively arranged to provide a gating signal to the gate circuit 48. The gate control circuit 53 is provided with a second pulse train input from the frequency synthesizer and pulse timer 47. As illustrated, the second pulse train has a repetition rate of one-pulse-per-second, the pulse repetition rate selected depending on the speed and nature of the vessel sought to be located or positioned and the possible relative motion of one transmitting station to the other transmitting station or stations. The actual pulse repetition rate selected, in any given case, for the output from the frequency synthesizer and pulse timer 47 depends on how often it is necessary or desirable to determine coarse location.

The gate control circuit 53 provides a start signal to the duration counter 52 which, in turn, supplies a stop signal to the gate control circuit 53.

In operation, the transmitter 50 amplifies the carrier signal from the gate circuit 48, which is turned ON and OFF at precisely determined times, in accordance with its gating signal received from the gate control circuit 53 and feeds a notch modulated signal to an antenna (unnumbered).

Since the atomic clock 45 is extremely stable and all control functions provided by the inputs to the gate control circuit 53 are locked to the atomic clock 45, it will be understood that the gate circuit 48 may be opened and closed at precise times.

Assuming first that the gate circuit 48 is closed and the transmitter 50 is supplying the radio frequency signal to the antenna (unnumbered), upon the occurrence of a pulse from the frequency synthesizer and pulse timer 47, the gate control circuit 53 responds by supplying an OFF gating signal to the gate circuit 48, opening the gate circuit 48. The transmitter 50 ceases to supply the radio frequency signal to the antenna (unnumbered). Since the gating signal to the gate circuit 48 is derived from circuits controlled by the same atomic clock 45 which controls the production of the radio frequency signal supplied to the gate circuit 48, it is possible to open the gate circuit 48 at precisely a time when the radio frequency signal is passing through a zero point.

The duration counter 52 determines precisely the number of cycles the gate circuit 48 will hold the transmitter 50 in an OFF condition. The duration counter derives its START pulse from the gate control circuit 53 which simply passes the one-pulse-per-second pulses from the frequency synthesizer and pulse timer 47, to an AND circuit (not illustrated) within the duration counter 52 which provides a START counting signal whenever a clock pulse from the zero line crossing detector 51 occurs at the same instant one of the one-pulse-per-second pulses is received from the gate control circuit 53. The duration counter 52 generates internally its own STOP signal derived at a predetermined count. The internally generated STOP signal is fed from the duration counter 52 to the gate control circuit 53 which responds by supplying an ON gating signal to the gate circuit 48, closing the gate circuit 48. The transmitter 50 again supplies the radio frequency signal to its antenna (unnumbered), the signal is broadcasted until once again a pulse is supplied from the frequency synthesizer and pulse timer 47, and the operation is repeated, the duration counter 52 having been RESET by the first non-coincident pulse it received subsequent to the generation of the STOP signal.

The antenna (unnumbered) fed by the transmitter 50 radiates a notch modulated radio frequency signal of known frequency, for example 3.12 MHz, and of given absolute phase, the frequency and phase of the radio frequency signal being controlled by the atomic clock 45 and reflecting its extremely high stability and accuracy. The leading and trailing edges of the modulation notches, which interrupt the radio frequency signal radiated from the antenna (unnumbered) associated with the transmitter 50 are very accurately positioned, again reflecting the stability and accuracy of the atomic clock 45.

Since the gate circuit 48 opens and closes at specific times during which the radio frequency signal is passing through a zero point, it will be appreciated that the transmitting station illustrated in FIG. 5 generates little or no sidebands and, as a practical matter, is a very narrow band transmitting station.

As shown in FIG. 6, a receiving station particularly useful in a position locating system involving notch modulation includes an atomic clock 54 having the same construction as the atomic clock 45 (FIG. 5). An output from the atomic clock 54 is coupled to a frequency synthesizer 55, to a frequency synthesizer 56 and to a frequency synthesizer and pulse timer 57.

An output from the frequency synthesizer 55, which may correspond in frequency to the carrier wave transmitted from a transmitting station forming part of a position locating system, is coupled as a high frequency input to a limiter 58. An output, which is essentially a square wave, from the limiter 58 is coupled to a pulse shaper 60 which differentiates the square wave input, resulting in a train of alternately positive going and negative going pulses. The train of pulses is clipped to provide an output, in the form of a train of pulses of one polarity from the pulse shaper 60, which is coupled as a clock input to a time comparator 61. Each pulse of the train of pulses of one polarity from the pulse shaper 60 represents a zero crossing of the high frequency input fed to the limiter 58.

The frequency synthesizer 56, under the control of the atomic clock 54, is operative to produce a fixed radio frequency signal, at its output, identical in frequency to the radio frequency signal, for example 3.12 MHz, broadcasted by one of the transmitting stations located at points A, B or D (FIGS. 1A–1D), the transmitting station being constructed as shown in FIG. 5.

The fixed radio frequency signal from the frequency synthesizer 56 is coupled, via a gate circuit 65, as an interrupted first radio frequency input signal to the time comparator 61. An interrupted second radio frequency input signal is supplied to the time comparator 61 from a receiver 66 which may be a TRF receiver operatively tuned to receive a radio frequency signal, for example 3,12 MHz, from one of the transmitting stations located at points A, B or D (FIGS. 1A–1D), the receiver 66 being tuned to the same frequency produced by the frequency synthesizer 56.

A portion of the fixed radio frequency signal from the frequency synthesizer 56 is fed to a zero line crossing detector 62 which, like the zero line crossing detector 51 associated with the transmitting station illustrated in FIG. 5, produces a train of pulses, each pulse representing, for example, a negative-to-positive zero crossing of a radio frequency signal, it being necessary to provide the same pulse train configuration from the zero line crossing detector 62 as from the zero line crossing detector 51 (FIG. 5). Of course, positive-to-negative zero crossings or both negative-to-positive and positive-to-negative crossings could be represented by the pulses provided from the zero line crossing detector 62 in the event zero line crossing detector 51 (FIG. 5) produces representative pulses of such derivation.

The pulse train output from the zero line crossing detector 62 is supplied, as a clock input, to a duration counter 63 and as an input to a gate control circuit 64 which is operatively arranged to provide a gating signal to the gate circuit 65. The gate control circuit 64 is provided with a second pulse train input from the frequency synthesizer and pulse timer 57. The second pulse train, as illustrated, has a pulse repetition rate of one-pulse-per-second, the pulse repetition rate selected being identical to the pulse repetition rate selected for the output of the frequency synthesizer and pulse timer 47 (FIG. 5) forming part of a transmitting station. The actual pulse repetition rate selected depends on the speed and nature of the vessel carrying a receiving station constructed to comprise the receiving arrangement illustrated in FIG. 6 as part of a receiving station at the point C (FIGS. 1A–1D) and the possible relative motion of one transmitting station with respect to other transmitting stations as illustrated, for example, in FIG. 1D. In practice, the pulse repetition rate selected for the outputs from the frequency synthesizer and pulse timer 47 (FIG. 5) and the frequency synthesizer and pulse timer 57 (FIG. 6) depends on how often it is necessary or desirable to determine coarse location when the vessel or object sought to be located is travelling at its maximum expected speed directly away from one of the transmitting stations.

The gate control circuit 64 supplies a start signal to the duration counter 63 which, in turn, supplies a stop signal to the gate control circuit 64.

In operation, the time comparator 61 receives the first radio frequency signal from the frequency synthesizer 56 via the gate circuit 65, which is turned ON and OFF at precisely determined times, in accordance with its gating signal received from the gate control circuit 64.

Since the atomic clock 54 is extremely stable and all control functions provided by the inputs to the gate control circuit 64 locked to the atomic clock 54, it will be understood that the gate circuit 65 may be opened and closed at precise times.

Assuming that the gate circuit 65 is initially closed and the first radio frequency signal is being supplied to the time comparator 61 from the frequency synthesizer 56 via the gate circuit 65, upon the occurrence of a pulse from the frequency synthesizer and pulse timer 57, the gate control circuit 64 responds by supplying an OFF gating signal to the gate circuit 65, opening the gate circuit 65 thereby interrupting the radio freqeuncy signal being supplied to the time comparator circuit 61 from the frequency synthesizer 56. Since the OFF gating signal to the gate circuit 65 is derived from circuits controlled by the same atomic clock 54 which controls the production of the first radio frequency signal supplied to the gate circuit 65, it is possible to open the gate circuit 65 at precisely a time when the radio frequency signal being coupled through the gate circuit 65 passes through a zero point.

The duration counter 63 determines precisely the number of cycles the gate circuit 65 is in an OFF (open) condition.

The duration counter 63 receives a START pulse from the gate control circuit 64 which simply passes the one-pulse-per-second pulses from the frequency synthesizer and pulse timer 57 to an AND circuit (not illustrated) within the duration counter 63 which provides a START counting signal whenever a clock pulse from the zero line crossing detector 62 occurs at the same instant one of the one-pulse-per-second pulses is received from the gate control circuit 64. The duration counter 63 generates internally its own STOP signal derived upon the occurrence of a predetermined count. The internally generated STOP signal is fed from the duration counter 63 to the gate control circuit 64 which responds by supplying an ON gating signal to the gate circuit 65, again opening the gate circuit 65 thereby allowing the first radio frequencysignal from the frequency synthesizer 56 to be again fed to the time comparator 61. Since the signals supplied to the gate control circuit 64 are all derived from circuits controlled by the atomic clock 54, the gate circuit 65 may be opened at a precise time when the radio frequency signal supplied to it is passing through a zero point.

The duration counter 63 is RESET by the first noncoincident pulse it receives from the zero line crossing detector subsequent to its generation of the STOP signal and the first radio frequency signal from the frequency synthesizer 56 continues to be supplied to the time comparator 61 until the gate control circuit 64 receives an additional pulse from the frequency synthesizer and pulse timer 57. Upon receipt of the additional pulse by the gate control circuit 54, the sequence of operation is repeated.

As hereinbefore described, the portion of a receiving station illustrated in FIG. 5 is effective to deliver to the time comparator 61 (1) a clock input, (2) a first (reference) radio frequency signal which has been produced and notch modulated at a receiving station, and (3) a second radio frequency signal which has been notch modulated at a transmitting station and received and amplified by the receiver 66.

Figure 7:
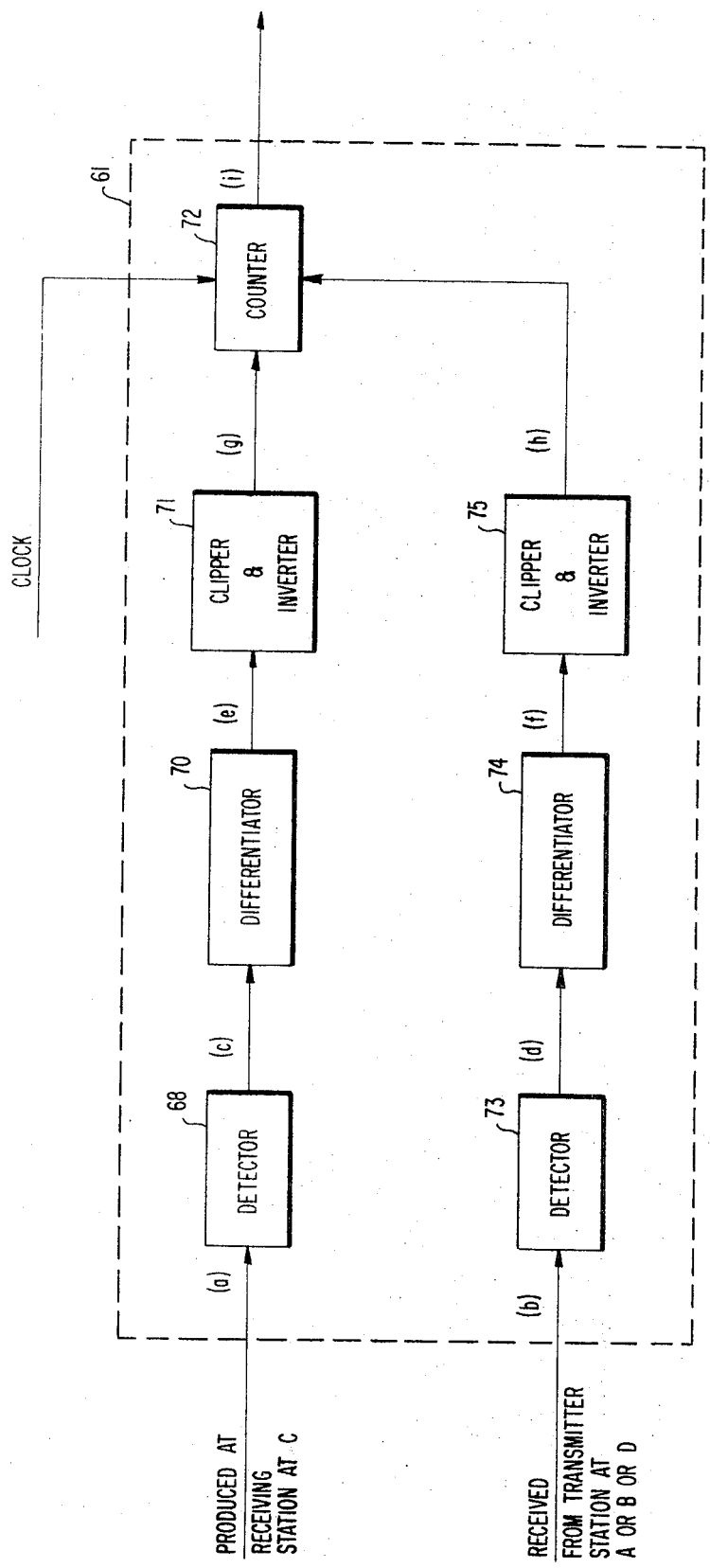
FIG. 7 is a block diagram of a time comparator suitable for use as the time comparator associated with the portion of a receiving station illustrated in FIG. 6.

Referring now to FIG. 7 the details of construction of a time comparator, suitable for use as the time comparator 61, is described below, reference being made to the waveforms illustrated in FIG. 8.

Figure 8:
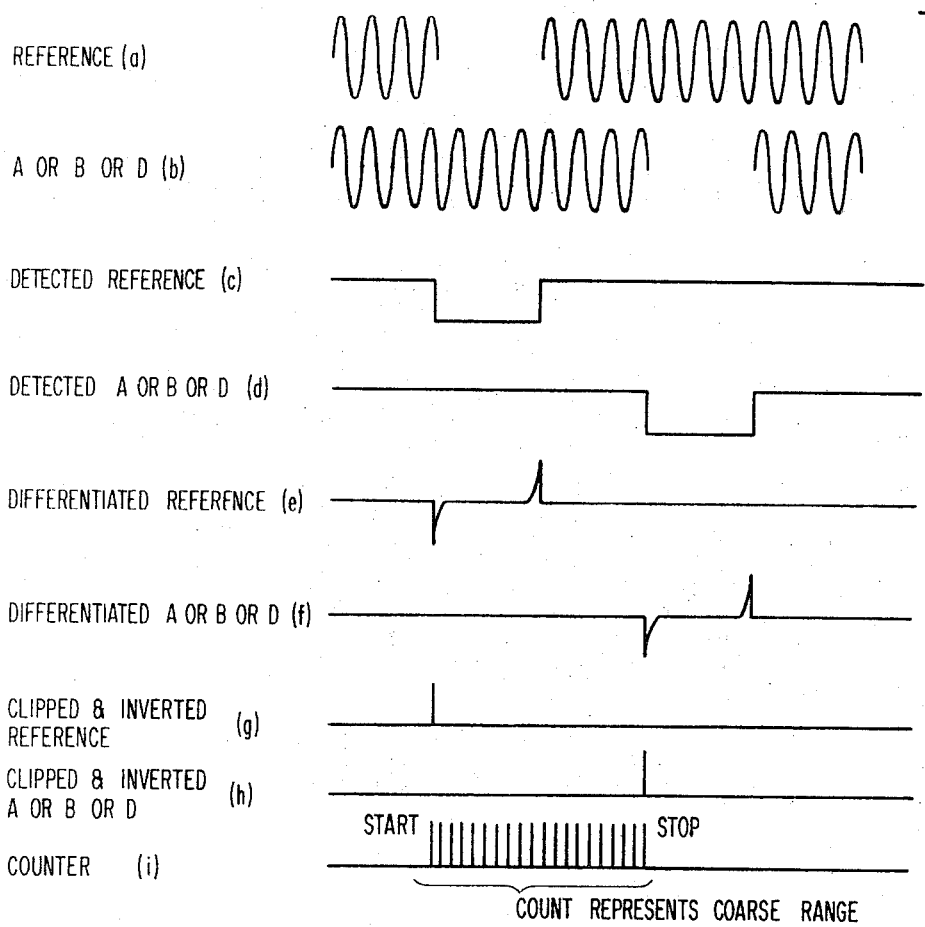
FIG. 8 shows a number of waveforms which are useful in understanding the operation of the time comparator illustrated in FIG. 7.

The time comparator 61, as illustrated in FIG. 7, includes a detector 68 which receives the notch modulated first (reference) radio frequency signal, shown as waveform (a) in FIG. 8, from the gate circuit 65 (FIG. 6). The detector 68 demodulates the reference notch modulated first radio frequency signal, waveform (a), providing a detected reference signal having a waveform shown as (c) in FIG. 8. The detected reference signal, waveform (c) is fed to a differentiator 70 which produces a pulse train consisting of alternately negative and positive going pulses, as shown in FIG. 8 as waveform (e). The pulse train consisting of the alternately negative and positive going pulses, waveform (e), is fed to a clipper and inverter 71 which produces a START pulse, shown as waveform (g) in FIG. 8. The START pulse, waveform (g), is coupled to a counter 72 and is effective to enable the counter 72 to start counting.

The time comparator 61 also includes a detector 73 which receives the notch modulated second radio frequency signal, shown as waveform (b) in FIG. 8, from the receiver 66 (FIG. 6). The detector 73 demodulates the second notch modulated radio frequency signal, waveform (b), providing a detected received signal having a waveform shown as (d) in FIG. 8. the detected received signal, waveform (d), is coupled to a differentiator 74 which produces a pulse train consisting of alternately negative and positive going pulses, as shown in FIG. 8 as waveform (f). The pulse train consisting of alternately negative and positive going pulses, waveform (f), is coupled to a clipper and inverter 75 which produces a STOP pulse, shown as waveform (h) in FIG. 8. The STOP pulse, waveform (h), is fed to the counter 72 and is effective to cause the counter 72 to cease counting.

The counter 72 is provided with an internal reset means (not illustrated) to develop its own RESET signal upon its receipt of the first clock pulse, from the pulse shaper 60 (FIG. 6), subsequent to receipt of the STOP pulse provided from the clipper and inverter 75.

The output from the counter 72 is a train of pulses, shown as waveform (i) in FIG. 8. The precise number of pulses in waveform (i), which are produced in response to the clock input during the interval between the application of the START pulse, waveform (g) and the STOP pulse, waveform (h), to the counter 72 represents the time diffeence between the leading edge of a notch in the first (reference) radio freqeuncy signal produced at a receiving station C (FIGS. 1A–1D) and the leading edge of a notch in the second radio frequency signal as received at the receiving station from a transmitting station A or B or D (FIGS. 1A–1D) of known location. It follows from the foregoing that the time interval is directly related to the distance the receiving station C is from one of the transmitting stations A or B or D.

The pulse train output, waveform (i) in FIG. 8, from the counter 72 is the output from the time comparator 61 (FIG. 6).

Referring again to FIG. 6, the output from the time comparator 61 is coupled to a range computer 67 which converts the output into coarse distance data indicative of the approximate distance receiving station C (FIGS. 1A–1D) is from one of the transmitting stations A or B (FIGS. 1A and 1C) or transmitting stations A or B or D (FIGS. 1B and 1D). The receiving station C, it will be understood, includes one or two channels (not illustrated) in addition to the single channel illustrated in FIG. 6 for the purpose of developing coarse distance data indicative of the approximate distance receiving station C is from one or two of the additional transmitting stations. Each of the additional channels includes a time comparator silimar to the time comparator 61 and means for providing appropriate inputs thereto froma gate circuit similar to the gate circuit 65 and a receiver similar to the receiver 66. All of the channels are controlled from the single atomic clock 54. Each channel provides an input to the range computer 67. In the event an altimeter is used (FIG. 1C), altitude data would be fed to the distance computer 67.

In the receiving arrangement shown in FIG. 6, a phase comparator 59 is used to develop fine distance data indicative of distance which, when added to the distance as determined from coarse distance data, establishes with a high degree of accuracy the distance receiving station C (FIGS. 1A–1D) is from one of the transmitting stations (FIGS. 1A–1D).

The phase comparator 59 receives, as a reference input, the locally produced first (reference) radio frequency signal which passes through the gate circuit 65. As its second input, the phase comparator 59 receives the amplified second radio frequency signal, having the frequency as the reference signal, from the receiver 66.

The output signal of the phase comparator 59 is proportional to the fine distance the receiving station C (FIGS. 1A–1D) is from one of the transmitting stations A or B or D (FIGS. 1A–1D). The output signal from the phase comparator 59 is coupled to the range computer 67 which converts the output into fine distance data, indicative of the distance which must be added to the already described coarse distance data to determine, with a very high degree of accuracy, the distance receiving station C is from one of the transmitting stations A or B or D.

As in the case of developing coarse position data, the receiving station C (FIGS. 1A–1D), when provided with the receiving arrangement shown in FIG. 6, includes one or two channels (not illustrated) in addition to the single channel illustrated in FIG. 6 for the purpose of developing fine distance data. Each additional channel would include a phase comparator similar to the phase comparator 59, a receiver similar to the receiver 66 and a gate circuit similar to the gate circuit 65 in association with devices for providing an appropriate first (reference) signal of selected frequency produced under the control of the atomic clock 54. The outputs from each of the additional phase comparators (not illustrated) would be fed as inputs to the range computer 67. In practice the range computer 67 would feed a position computer, similar to the position computer 25 shown in FIG. 3, which in turn could supply inputs to a position keeper and display, such as the position keeper and display 26 illustrated in FIG. 3.

It will be appreciated that the time comparator illustrated in FIG. 7 depends for accuracy on the rise time of a detected notch envelope. A preferred time comparator, which does not suffer from possible inaccuracy due to relatively poor rise time, is shown in FIG. 9 which is described below, reference being made to the waveforms illustrated in FIG. 10.

Figure 9:
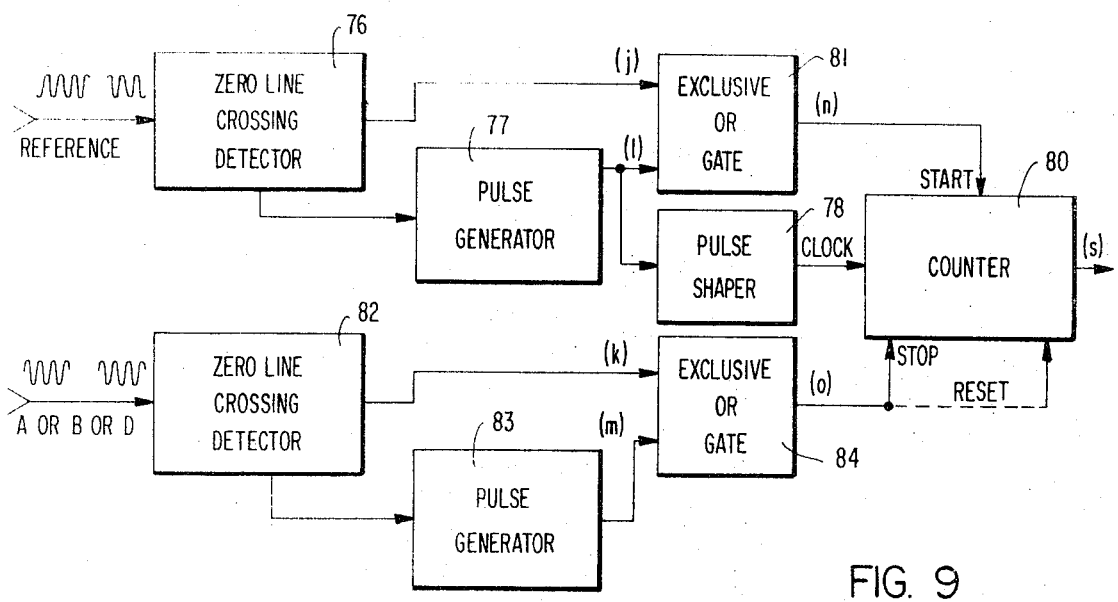
FIG. 9 illustrates a preferred embodiment of a time comparator which may be used as part of a modified embodiment of the receiver shown in FIG. 6.
Figure 10:
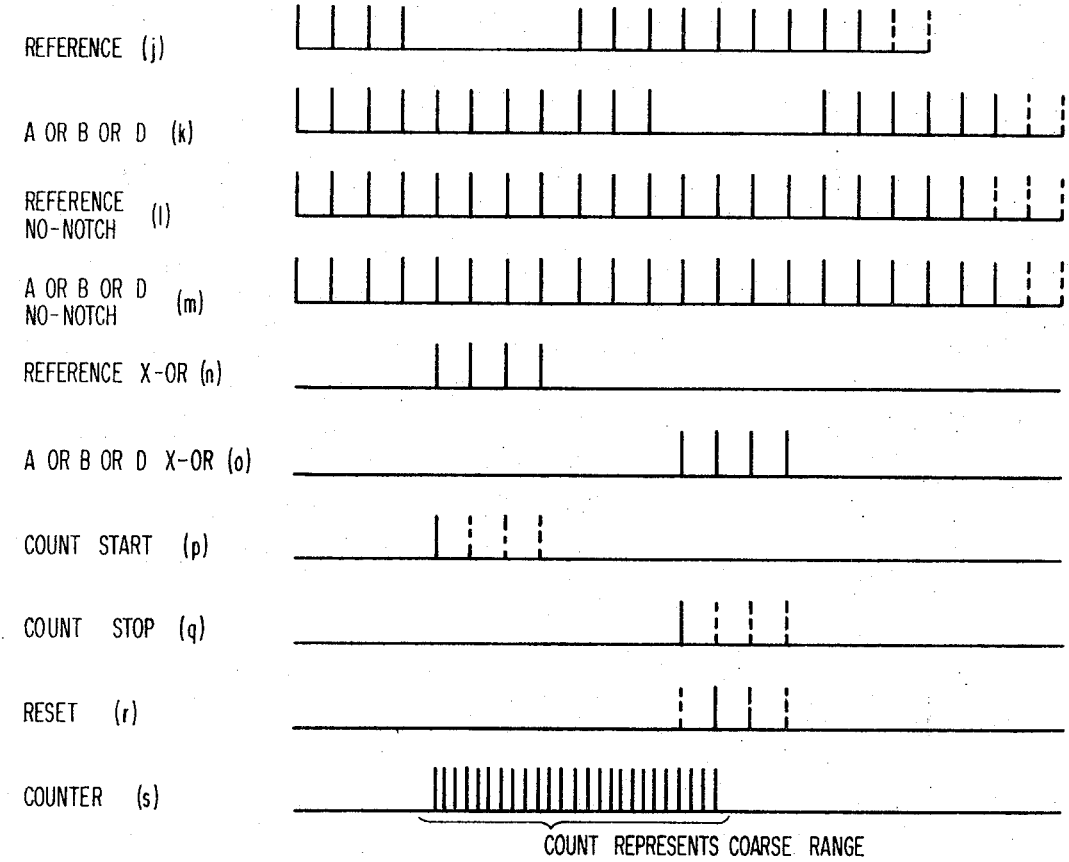
FIG. 10 shows a number of waveforms which are useful in understanding the operation of the time comparator illustrated in FIG. 9.

As shown in FIG. 9, the preferred very precise time comparator, which can be used as the time comparator 61 shown in FIG. 6 and its associated clocking input arrangement includes a first zero line crossing detector 76 which produces, as illustrated, a train of pulses shown as waveform ($j$) in FIG. 10, each pulse representing a negative-to-positive zero crossing of the locally generated first (reference) radio frequency signal. It will be appreciated, however, that each pulse could represent a positive-to-negative zero crossing or both positive-to-negative and negative-to-positive zero crossings if desired.

The train of pulses, waveform ($j$), from the zero line crossing detector 76 is fed, as a synchronizing input, to a free running pulse generator 77 which produces a train of pulses, shown as waveform (1) in FIG. 10, having the same pulse repetition rate as the pulses it receives from the zero line crossing detector 76.

The train of pulses, waveform ($l$) from the pulse generator 77 is fed to a pulse shaper 78 which provides a clock input to a counter 80, the pulse shaper 78, as illustrated, merely sharpening the pulses and acting as a buffer without changing either the number or position of the pulses. The pulse shaper 78 may, if desired, multiply the number of pulses providing a train of pulses having a greater repetition rate as shown, for purpose of illustration, in FIG. 10. The train of pulses, waveform ($l$), is also fed as one input to an exclusive OR gate 81 which receives, as its second input, the output train of pulses, waveform ($j$), from the zero line crossing detector 76. The exclusive OR gate 81 produces an output, illustrated as waveform ($n$) in FIG. 10, in accordance with the known function of exclusive OR circuits. The output, waveform ($n$) from the exclusive OR gate 81, is fed to the counter 80 as a START count input, only the first pulse received by the counter 80 acting as a START signal, as illustrated by the pulse shown as a solid line in waveform ($p$) in FIG. 10, the pulses shown in dashed lines being redundant and ineffective as START signals.

The precise time comparator illustrated in FIG. 9 also includes a second zero line crossing detector 82 which produces, as illustrated, a train of pulses shown as waveform ($k$) in FIG. 10, each pulse representing a negative-to-positive zero crossing of the notch modulated, received and amplified second radio frequency signal from the receiver 66.

The train of pulses, waveform ($k$), from the zero line crossing detector 82 is fed, as a synchronizing input, to a free running pulse generator 83 which produces a train of pulses, shown as waveform ($m$) in FIG. 10, having the same pulse repetition rate as the pulses it receives from the zero line crossing detector 82.

The train of pulses, waveform ($m$), is fed as one input to an exclusive OR gate 84. The OR gate 84 receives, as its second input, the output train of pulses, waveform ($k$), from the zero line crossing detector 82. The exclusive OR gate 84 produces an output, illustrated as waveform ($o$) in FIG. 10, in accordance with the well known function of exclusive OR circuits. The output, waveform ($o$), from the exclusive Or gate 84 is fed to the counter 80 as a STOP count input, only the first pulse received by the counter 80 acting as a STOP signal, as illustrated by the pulse shown as a solid line in waveform ($q$), the pulses shown in dashed lines being ineffective as STOP signals.

The counter 80 is provided with an internal means (not illustrated) for developing its own RESET signal, which signal is produced upon the occurrence of the first pulse received from the exclusive OR gate 84 subsequent to the response of counter 80 to a STOP signal, the RESET pulse being illustrated as a solid line in waveform ($r$) shown in FIG. 10, the pulses represented by dashed lines being ineffective as RESET signals. The dashed line shown as a RESET input to the counter 80 represents functionally the internal means for resetting the counter 80.

The output signal from the counter 80, shown as waveform ($s$) in FIG. 10, is a train of pulses consisting of the coarse distance data, indicative of the coarse distance a receiving station C (FIGS. 1A–1D) is from one of the transmitting stations A or B or D (FIGS. 1A–1D). In practice, the output signal from the counter 80 would be fed as one of the inputs to the range computer 67.

Of the various types of modulation which may be used in practicing the invention, frequency shift keying is the most immune to noise. While frequency shift keying of transmitters may be accomplished in well known manners, such as by electrically or electronically switching a transmitter component, this would tend to degrade coarse distance measurement because of relatively long and imprecise switching times. A preferred transmitting station, which could be used for transmitting staions A, B and D (FIGS. 1A–1D) in a system using shift keying, is illustrated in FIG. 11.

Figure 11:
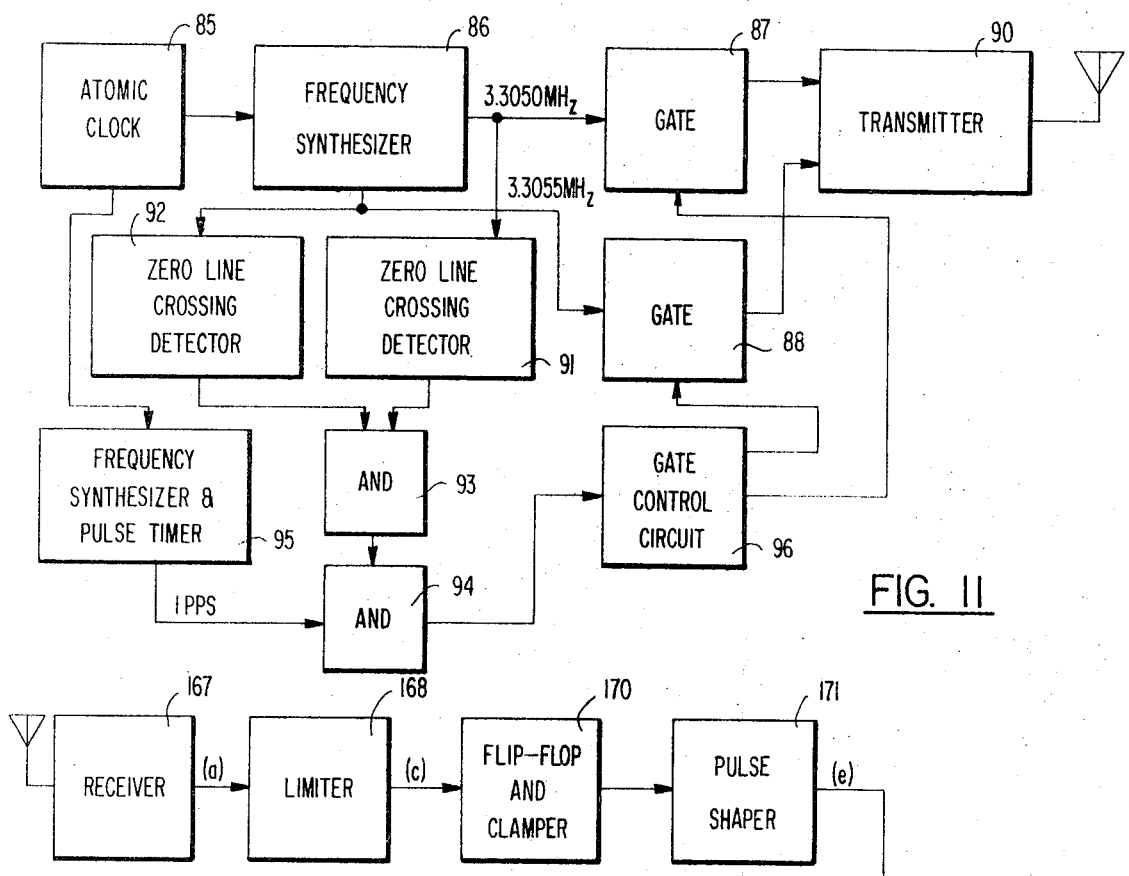
FIG. 11 is a block diagram of an illustrative embodiment of a frequency shift keyed transmitter according to the invention.

Referring to FIG. 11, the frequency shift keyed transmitting station includes an atomic clock 85 which supplies an input signal to a frequency synthesizer 86 which reduces the high frequency signal supplied to two radio frequency signals which have respectively, for example, a frequency of 3.3050 MHz and a frequency of 3.3055 MHz. The two radio frequency signals are fed respectively to a gate circuit 87 and a gate circuit 88.

Each of the gate circuits 87 and 88 is coupled to a transmitter 90 and is operative to feed alternatively the radio frequency signal of 3.3050 MH$_z$ and the radio frequency signal of 3.3055 MH$_z$ to the transmitter 90 as will be described in more detail hereinafter.

The transmitter 90 amplifies the signals supplied from the gate circuit 87 and the gate circuit 88, radiating the amplified signals from its associated antenna (unnumbered).

In addition to supplying the two radio frequency signals to the gate circuits 87 and 88, the frequency synthesizer 86 supplies respectively the 3.3050 MH$_z$ signal and the 3.3055 MH$_z$ signal to a zero line crossing detector 91 and a zero line crossing detector 92, each of which generates a train of pulses representing negative-to-positive, for example, zero line crossings of the respective radio frequency signals. As before, the positive-to-negative or both negative-to-positive and positive-to-negative zero line crossings could be used, if desired, design considerations being taken into account.

The trains of pulses from the zero line crossing detectors 91 and 92 are coupled as two inputs to an AND circuit 93, the output of which is fed as one input to an AND circuit 94. The AND circuit 94 is provided with a second input from a frequency synthesizer and pulse timer 95, controlled by the atomic clock 85, and which produces a train of pulses, for example, one pulse per second, the actual rate used depending on the speed of the craft sought to be located and the possible relative motion of the transmitting stations A, B and D (FIGS. 1A–1D) which are constructed as shown in FIG. 11.

The AND circuit 94 has its output coupled to a gate control circuit 96, which may be a bistable flip-flop, having two complementary outputs. A first output from the gate control circuit 96 is coupled as a control enabling input to the gate circuit 87. A second output from the gate control circuit 96 is coupled as a control enabling input to the gate circuit 88.

In operation one or the other of the gate circuits 87 and 88 is closed at all times thereby supplying one or the other of the 3.3050 MH$_z$ and 3.3055 MH$_z$ signals to the transmitter 90. Since the switching action is provided from the gate control circuit 96 which, in turn, is controlled by an output from a double coincidence circuit, the AND circuits 93 and 94, switching from one signal frequency to the other signal frequency takes place at essentially a zero line crossing the radio frequency signals periodically at a low rate determined by the pulse repetition rate of the train of pulses supplied from the frequency synthesizer and pulse timer 95. The transmitting station shown in FIG. 11 functions to switch from the 3.3050 MH$_z$ signal to the 3.3055 MH$_z$ signal and vice versa at zero line crossing points within the time interval corresponding to the width of each pulse of the one-pulse-per-second pulse train supplied from the frequency synthesizer and pulse timer 95 to the AND circuit 94.

Since the switching of transmitter 90 from one frequency to another takes place at a precise time which is controlled from the atomic clock 85, it will be appreciated that the transmitted signals are highly accurate. Additionally, the frequency shift transmitting station shown in FIG. 11 generates little or no spurious side bands for switching from one frequency to the other always takes place at a zero line crossing point.

Receiving station C (FIGS. 1A–1D) may be constructed similarly to the receiving stations illustrated in FIG. 3 and in FIG. 4 for receiving frequency shift keyed signals from transmitting stations A and B (FIGS. 1A and 1C) when they are constructed as illustrated in FIG. 11. Each of the receivers 17 and 18 (FIGS. 3 and 4) would be provided with a suitable demodulator for detecting the frequency shift keyed signals received, which detected signals, in the form of pulses, would be passed to respective pulse time comparators 22 and 23 (FIG. 3) or to the multiplexer 43 (FIG. 4). In the case the system involves three transmitting stations (FIGS. 1B and 1D), the receiving station C (FIGS. 1B and 1D) would comprise an additional receiver having a frequency shift demodulator, associated circuitry and an additional time comparator if constructed in accordance with the illustration in FIG. 3, or an additional receiver having a frequency shift demodulator, associated circuitry and an additional connection to the multiplexer 43 if constructed in accordance with the illustration in FIG. 4.

Figure 12:
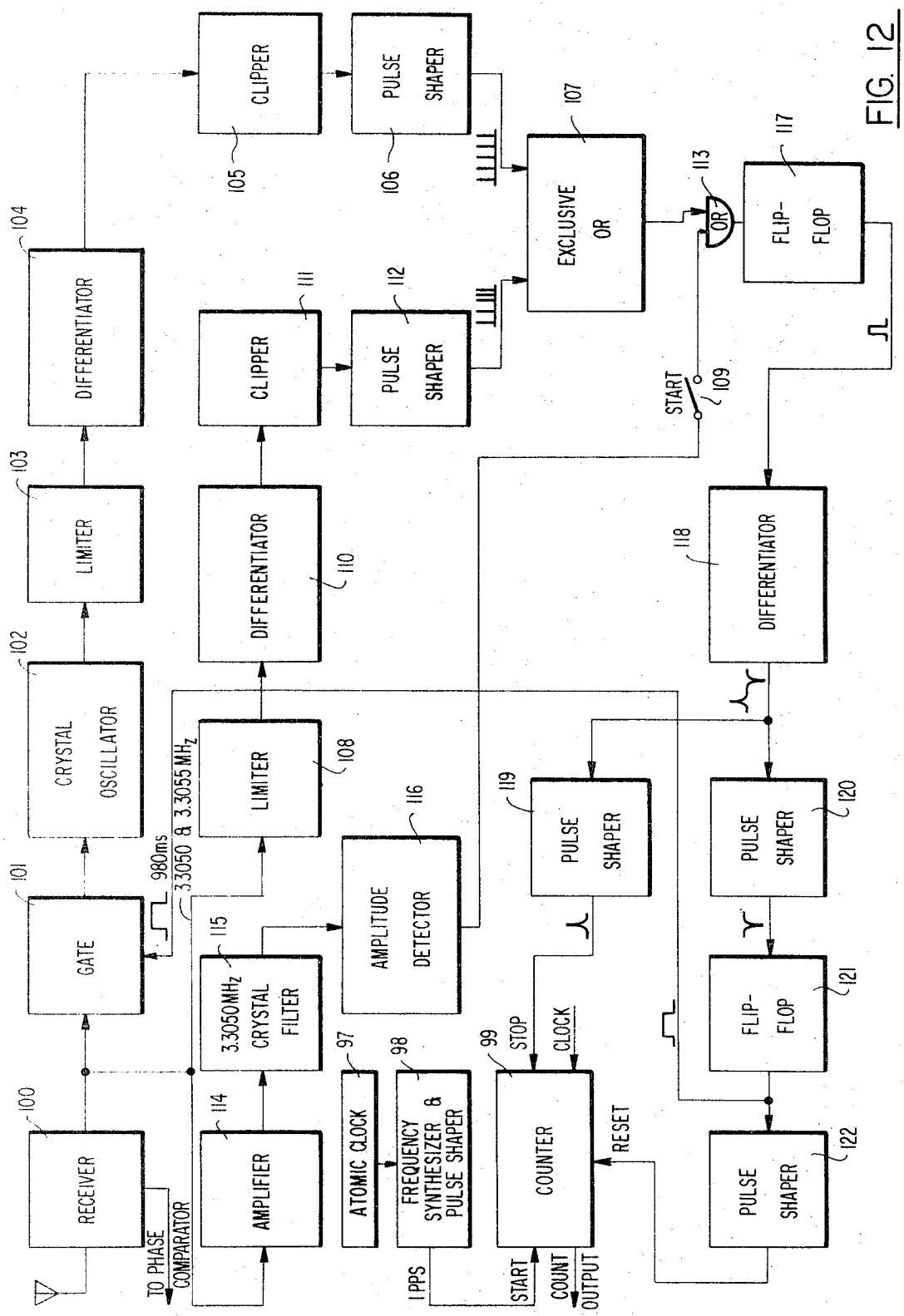
FIG. 12 is a simplified block diagram of a portion of a receiving station usable in a system including frequency shift keyed transmitters constructed as shown in FIG. 11.

As shown in FIG. 12, a preferred embodiment of a receiving station particularly suitable for receiving frequency shift modulation includes an atomic clock 97, only one channel of the receiving station being illustrated. It is to be understood that a complete receiving station would include one additional channel similarly constructed in a two dimensional arrangement (FIGS. 1A and 1C) or two additional channels similarly constructed in a three dimensional arrangement (FIGS. 1B and 1D), all channels being controlled by the atomic clock 97.

The atomic clock 97 supplies a very high frequency signal input to a frequency synthesizer and pulse shaper 98 which produces, as illustrated, a train of pulses having a pulse repetition rate of one pulse per second. The actual pulse repetition used depends on the speed of the receiving station C (FIGS. 1A–1D) and the relative motion of the transmitting stations (FIGS. 1A–1D), the design considerations having been mentioned earlier. The train of pulses from the frequency synthesizer and pulse timer 98 is coupled as a START signal to a counter 99.

A receiver 100 having an antenna (unnumbered) is arranged to receive and to amplify one of the frequency shift modulated radio signals, for example, a signal having a frequency of 3.3050 MH$_z$, shiftable to 3.3055 MH$_z$, from the transmitting station A (FIGS. 1A–1D). A portion of the energy received and amplified by receiver 100 is fed to a phase determining means (not illustrated) constructed similarly to the phase determining unit 20 (FIG. 3) with its associated circuitry, or to the phase comparator 30 (FIG. 4) with its associated circuitry for the purpose of developing fine distance data. The remaining parts, as shown in FIG. 12, function to develop coarse distance data.

A portion of the 3.3050 MH$_z$ energy from the receiver 100 is fed via gate circuit 101 as a synchronizing input to a highly stable oscillator 102, the gate circuit 101, as illustrated, opening for 980 milliseconds during times when the receiver 100 receives an unshifted signal input.

The 3.3050 MH$_z$ output from the crystal oscillator 102 is fed to a squaring amplifier or limiter 103, which, in turn, supplies a square wave input to a differentiator 104. The output from the differentiator 104, a train of alternatively negative going and positive going pulses, is passed through a clipper 105, a train of pulses of one polarity resulting as an output from the clipper 105.

The train of pulses of one polarity from the clipper 105, after being shaped by a pulse shaper 106, is fed as one input to an exclusive OR circuit 107.

An additional portion of the 3.3050 MHz energy, as well as a portion of 3.3055 MHz energy, received and amplified by the receiver 100 is fed to a squaring amplifier or limiter 108 which, in turn, supplies a square wave input to a differentiator 110. The output from the differentiator 110, a train of alternatively negative going and positive going pulses, is passed through a clipper 111, a train of pulses of one polarity resulting and constituting an output from the clipper 111.

The train of pulses of one polarity from the clipper 111 is shaped by a pulse shaper 112 which, in turn, supplies an input to the exclusive OR circuit 107.

Since the crystal oscillator 102 supplies a signal having only one frequency (3.3050 MHz), the input applied to the exclusive OR circuit 107 has a given set repetition rate. Since the receiver 100 supplies frequency shift keyed signals having alternately two frequencies, one being identical to the frequency of the crystal oscillator 102, to the limiter 108, the input applied to the exclusive OR circuit 107 from the pulse shaper 112 is identical to the input it receives from the pulse shaper 108 only during intervals the receiver 100 receives and amplifies the 3.3050 MHz signal. As a result, the exclusive OR circuit 107 supplies an output, in the form of a train of pulses, to an OR circuit 113 only for intervals during which the two inputs to the exclusive OR circuit differ.

Still an additional portion of the energy received and amplified by the receiver 100 is fed via an amplifier 114 to a series connected crystal filter 115 which is tuned to pass a 3.3050 MHz signal, while rejecting a 3.3055 MHz signal. Accordingly, the output from the crystal filter 115 is a signal of 3.3050 MHz, no signal being present in its output whenever the receiver 100 supplies a 3.3055 MHz signal to the crystal filter 115. An amplitude detector 116 receives the output from the crystal filter 115, responding to the absence of signal and providing a pulse output which is supplied as an input to the OR circuit 113 via a start switch 109. The channel comprising amplifier 114, crystal filter 115, amplitude detector 116 and start switch 109 is used only as a START signal providing function when the receiving station is first energized so as to provide initial synchronization only. This channel is nonfunctional during operation subsequent to starting.

The receipt by the OR circuit 113 of either a pulse from the amplitude detector 116, during initial starting, or from the exclusive OR circuit 107, during subsequent operation, causes a flip-flop circuit 117 to change states, the output from the flip-flop circuit 117 being, for example, a 10 millisecond pulse.

The 10 millisecond pulse from the flip-flop circuit 117 is coupled to a differentiator 118 which supplies alternatively positive going pulses and negative going pulses to pulse shapers 119 and 120.

The pulse shaper 119, in response to the positive going pulses received from the differentiator 118, supplies a STOP pulse to the counter 99 which had previously received a START pulse from the frequency synthesizer and pulse timer 98. The counter 99 is provided with a CLOCK input from a source (not illustrated) under the control of the atomic clock 97, the count output from the counter 99 representing coarse distance data which would be fed, with coarse distance data derived from one or two additional channels, to a computer, such as the computer 27 shown diagrammatically in FIGS. 3 and 4.

The pulse shaper 120, responding to the input from the differentiator 118, provides an input to a flip-flop circuit 121 which provides a square wave output signal having a 980 millisecond width. The square wave output from the flip-flop circuit 121 is supplied, as a gating input, to the gate circuit 101 allowing the gate circuit 101 to be OFF during intervals the receiver 100 receives the 3.3055 MHz signal, preventing the crystal oscillator 102 from being undesirably pulled.

A square wave output signal from the flip-flop circuit 121 is also fed to a pulse shaper 122 which differentiates the square wave signal, clips the resulting positive going pulse, and supplies the resulting negative going pulse in inverted form as a RESET signal to the counter 99 which is then ready to receive again a START signal from the frequency synthesizer and pulse shaper 98.

Figure 13:
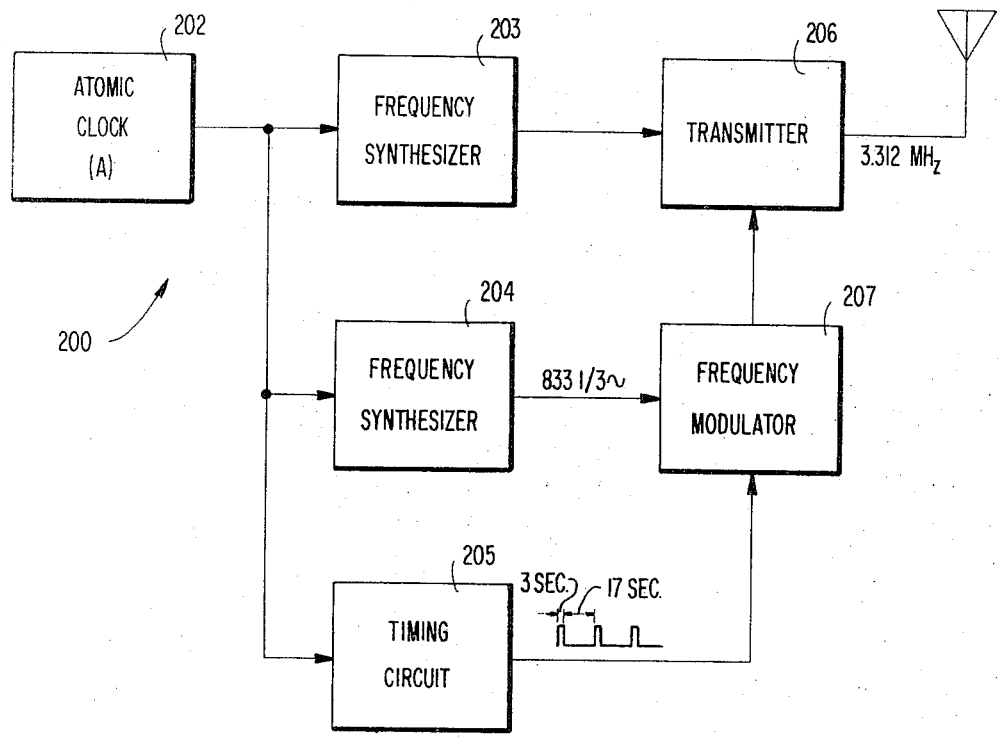
FIG. 13 is a block diagram of illustrative embodiments of two frequency modulated transmitter stations according to the invention.
Figure 13:
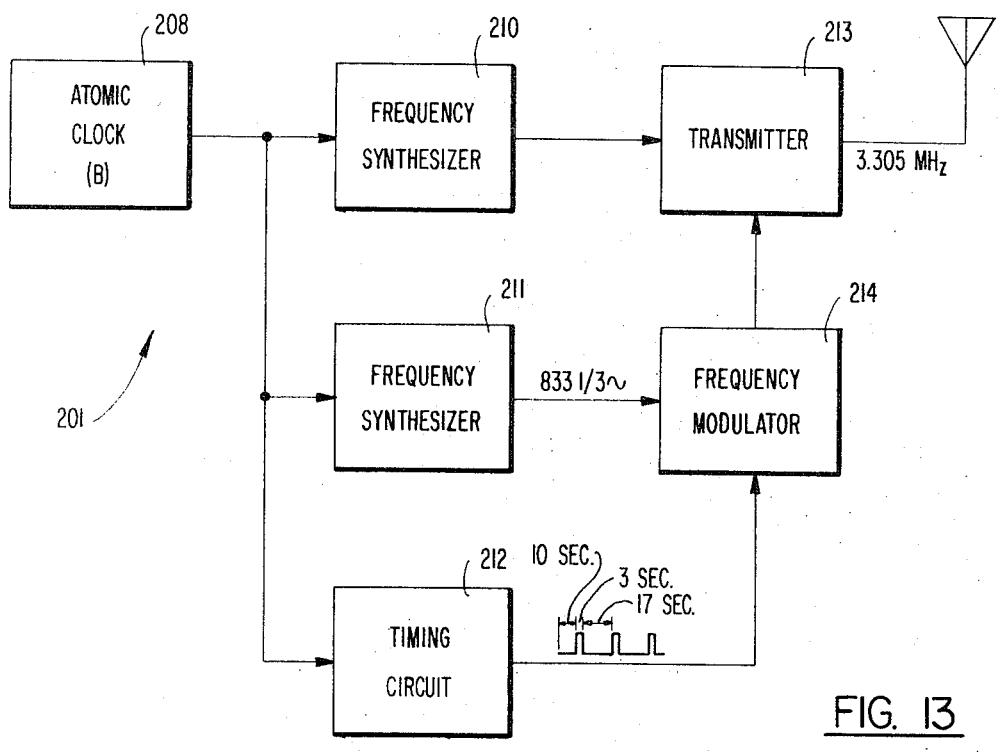

In FIG. 13 a simplified block diagram of two intermittently frequency modulated transmitting stations, designated respectively by reference numerals 200 and 201, is shown. The two transmitting stations 200 and 201, as illustrated, are particularly useful in a two-dimensional position locating system in which frequency demodulators and phase determining units are used at a receiving station for developing coarse position data. In a three-dimensional arrangement, such as illustrated in FIGS. 1B and 1D, an additional transmitting station would, of course, be provided.

The transmitting station 200, shown in FIG. 13, is designed as illustrated to transmit a 3.312 MHz signal. The transmitting station 200 includes an atomic clock 202 which provides a fixed high frequency input, for example 9 GHz, to a frequency synthesizer 203, a frequency synthesizer 204 and a timing circuit 205.

The frequency synthesizer 203 is designed to reduce the high frequency input signal from the atomic clock 202 to a signal having the selected 3.312 MHz frequency which is fed to a transmitter 206. The transmitter 206 has an antenna (unnumbered) from which an intermittently frequency modulated radio signal of 3.312 MHz is radiated.

An intermittently operable frequency modulator 207 is coupled to the transmitter 206 for intermittently frequency modulating the transmitter 206 with a fixed frequency signal which, for purposes of illustration, is shown as an 833⅓ cycle signal. The 833⅓ cycle modulation signal is supplied to the frequency modulator 207 from the frequency synthesizer 204 which is arranged to reduce its high frequency input from the atomic clock 202 to 833⅓ cycles.

The timing circuit 205, which may take the form of a frequency synthesizer and pulse timer, provides a pulse train output which is applied as an enabling input to the frequency modulator 207. The train of pulses from the timing circuit 205 may, in the case where the transmitting station 200 is used in a position locating system involving a relatively slow moving survey vessel, advantageously consist of pulses having widths of 3 seconds separated by 17 second intervals.

The pulses from the timing circuit 205 could, of course, have a narrow width such as 1½ seconds and be separated by 8½ second intervals, thereby providing a pulse repetition rate of one-pulse-per-10-seconds. The actual pulse repetition rate selected depends on the speed and nature of the vessel carrying the receiving station C (FIGS. 1A–1D) and the possible relative motion of one of the transmitting stations as illustrated, for example, in FIG. 1D. In practice, the pulse repetition rate selected for the output from the timing circuit 205 depends on how often it is necessary or desirable to determine coarse location when the vessel or object sought to be located is travelling at its maximum speed directly away from one of the transmitting stations.

Higher pulse repetition rates are desirable in the event the receiving station is carried by a fast moving ship or aircraft and/or one of the transmitting stations is carried by an unsynchronized satellite. A pulse repetition rate of about one-pulse-per-second would be suitable for systems using a fast moving ship. A pulse repetition rate of about 10-pulses-per-second would be suitable for systems using an aircraft for carrying the receiving station C (FIGS. 1B–1D). A pulse repetition rate of about 100-pulses-per-second would be appropriate for systems involving an unsynchonized satellite for carrying transmitting station D (FIG. 1D).

The transmitting station 201 shown in FIG. 13 is designed as illustrated to transmit a 3.305 MHz signal. The transmitting station 201 includes an atomic clock 208 which provides a fixed high frequency input, for example 9 GHz, to a frequency synthesizer 210, a frequency synthesizer 211 and a timing circuit 212.

The frequency synthesizer 210 is designed to reduce its high frequency input signal from the atomic clock 208 to a signal having the selected 3.305 MHz frequency which is fed to a transmitter 213. The transmitter 213 has an antenna (unnumbered) from which an intermittently frequency modulated radio signal of 3.305 MHz is radiated.

An intermittently operable frequency modulator 214 is coupled to the transmitter 213 for intermittently frequency modulating the transmitter 213 with a fixed frequency signal which, for purposes of illustration, is shown as an 833⅓ cycle signal. The 833⅓ cycle modulation signal is supplied to the frequency modulator 214 from the frequency synthesizer 211 which is arranged to reduce its high frequency input from the atomic clock 208 to 833⅓ cycles.

The timing circuit 212, which may take the form of a frequency synthesizer and pulse timer, provides a pulse train output which is applied as an enabling input to the frequency modulator 214. The train of pulses from the timing circuit 212 has the same repetition rate as the train of pulses from the timing circuit 205 of the transmitting station 200; however, the pulses from the timing circuit 212 are time displaced relative to the pulses from the timing circuit 205. For example, in the case of a pulse repetition rate of one-pulse-per-20 second interval, the position of the pulses supplied from the timing circuit 212 would, in a two-dimensional system, desirably be displaced by 10 second intervals from the pulses supplied from the timing circuit 205.

The two transmitting stations 200 and 201 are spaced from one another and from yet another transmitting station as well in a three-dimensional arrangement, if desired, and are operative, as illustrated, to transmit from their respective antennae (unnumbered) radio signals having respectively frequencies of 3.312 MHz and 3.305 MHz, each radio signal being intermittently frequency modulated at a given repetition rate with an 833⅓ cycle signal, the modulation intervals being time displaced.

The frequency modulations appearing on the 3.312 MHz and 3.305 MHz carrier signals from the transmitting stations 200 and 201 are utilized at a moving receiving station to produce coarse position data, and the phase relationships of the radio frequency carrier signals are utilized at the moving receiving station to produce fine position data.

Figure 14:
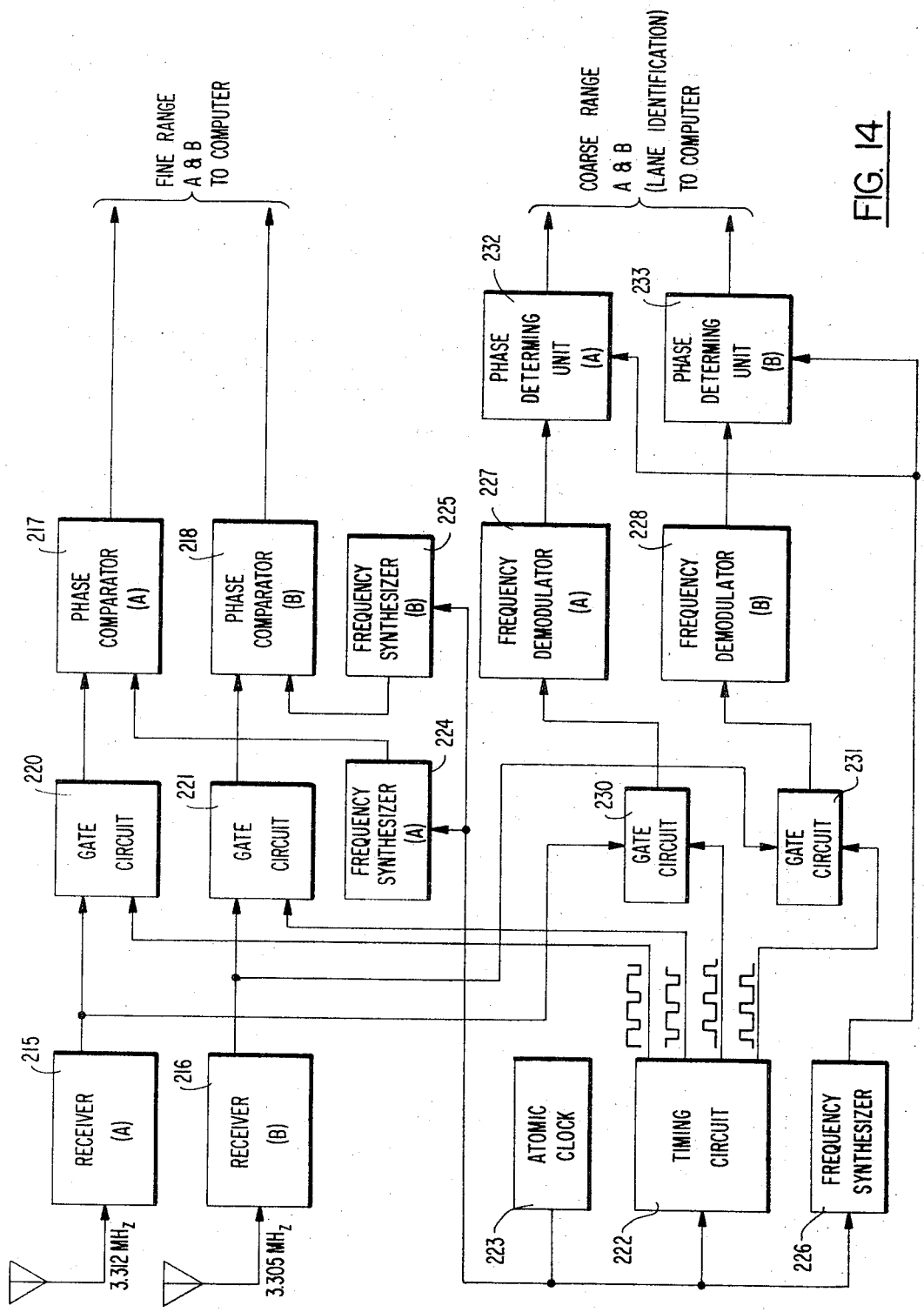
FIG. 14 is a block diagram of an illustrative embodiment of a receiving station usable in a system including frequency modulated transmitters constructed as shown in FIG. 13.

Referring to the receiving station shown in FIG. 14, the 3.312 MHz intermittently frequency modulated signal from the radio transmitter 206 (FIG. 13) is received by a receiver (A), designated by the numeral 215, via its associated antenna (unnumbered), and the 3.305 MHz intermittently frequency modulated signal from the radio transmitter 213 (FIG. 13) is received by a receiver (B), designated by the numeral 216, via its associated antenna (unnumbered).

The receivers 215 and 216 amplify respectively the received 3.312 MHz and 3.305 MHz signals and supply respectively the resulting amplified signals as first inputs to a phase comparator (A), designated by the numeral 217, and a phase comparator (B), designated by the numeral 218, via a gate circuit 220 and a gate circuit 221, respectively.

Each of the gate circuits 220 and 221 is provided respectively with a controlling input, in the form of a train of pulses, from a timing circuit 222 which is operatively arranged to allow the gate circuits 220 and 221 to pass signals to the phase comparators 217 and 218 only during intervals when the respective radio signals received by the receivers 215 and 216 are not frequency modulated. The pulse repetition rate of the trains of pulses supplied to the gate circuits 220 and 221 is the same as the pulse repetition rate selected for the trains of pulses used to control the frequency modulators 207 and 214 (FIG. 13). For example, the gate circuits 220 and 221 may be respectively disabled during 3 second intervals every twenty seconds when the receivers 215 and 216 receive frequency modulated signals. In practice, the gate circuits 220 and 221 would be disabled during periods somewhat longer than the interval frequency modulation appears on the respective carriers to assure no frequency modulated signals reach the phase comparators 217 and 218. Since the timing circuit 222, as shown, is controlled by an output from an atomic clock 223, it will be appreciated that the occurrence and duration of the ON intervals and the OFF intervals of the gate circuit 220 and the gate circuit 221 are precisely controlled. The atomic clock 223 has the same construction as the atomic clocks 202 and 208 (FIG. 13) and produces a high frequency signal, for example a 9.0 GHz signal, having the same frequency as the signals produced by the atomic clocks 202 and 208.

In addition to supplying the input to the timing circuit 222, the atomic clock 223 supplies a high frequency input signal of 9.0 GHz to a first frequency synthesizer 224, a second frequency synthesizer 225 and a third frequency synthesizer 226.

The first frequency synthesizer 224 operatively reduces its high frequency input from the atomic clock 223 to a signal having a frequency of 3.312 MHz which is fed as a second input to the phase comparator 217. The second frequency synthesizer 225 reduces its high frequency input from the atomic clock 223 to a signal having a frequency of 3.305 MHz which is coupled to the phase comparator 218 as its second input.

The phase comparators 217 and 218 are effective to compare respectively the phase of the two signals each receives thereby producing respective output signals representing fine position data which output signals are fed to a computer (not shown in FIG. 14) such as the computer 27 shown in FIGS. 3 and 4. The magnitudes of the output signals from the phase comparator 217 and the phase comparator 218 are directly related respectively to the distance, within a single lane, the receiving station, shown in FIG. 14, is from each of the transmitting stations illustrated in FIG. 13.

Amplified frequency modulated 3.312 MHz and amplified frequency modulated 3.305 MHz signals from the receivers 215 and 216 are coupled respectively to frequency demodulators 227 and 228 via a gate circuit 230 and a gate circuit 231. The gate circuits 230 and 231 each receives a respective controlling input signal in the form of a train of pulses from the timing circuit 222, the gate circuits 230 and 231 being disabled respectively during intervals when unmodulated amplified signals are being supplied from the receivers 215 and 216. Since the timing circuit 222 is controlled by an output from the atomic clock 223, the occurrence and duration of the ON intervals and the OFF intervals of the gate circuits 230 and 231 are precisely controlled. The pulse repetition rate of the trains of pulses supplied to the gate circuits 230 and 231 is identical to the pulse repetition rate of the trains of pulses supplied to the gate circuits 220 and 221 (FIG. 13).

The frequency demodulators 227 and 228 produce respective output signals having a frequency of 833⅓ cycles in the illustrative embodiment of the system which includes the two frequency modulated transmitters 200 and 201 (FIG. 13) which, as illustrated, transmit carrier signals intermittently frequency modulated with 833⅓ cycle signals.

The 833⅓ cycle output signals from the frequency demodulator 227 and the frequency demodulator 228 are fed respectively as first inputs to phase determining units 232 and 233.

Each of the phase determining units 232 and 233 is supplied with a second 833⅓ cycle input signal from the frequency synthesizer 226 which effectively reduces the high frequency signal it receives from the atomic clock 223 to a signal of the required 833⅓ cycles.

The signals produced in the phase determining units 232 and 233, which compare the phase of each of the two 833⅓ cycle signals each receives against the 833⅓ cycle reference signal produced by the atomic clock 223, are effectively averaged within each of the phase determining units 232 and 233, the resulting output signals from the phase determining units 232 and 233 constituting respectively coarse position data. The output signals from each of the phase determining units 232 and 233 represent respectively the coarse distance the receiving station shown in FIG. 14 is from each of the transmitting stations illustrated in FIG. 13. The output signals from the phase determining units 232 and 233 are fed to a computer (not illustrated in FIG. 14) such as the computer 27 shown in FIGS. 3 and 4.

The computer (not shown in FIG. 14), it will be understood, is operatively effective to compute from signals it receives from the phase comparator 217, the phase comparator 218, the phase determining unit 232 and the phase determining unit 233, the distance a receiving station constructed as shown in FIG. 14 is from each of the transmitting stations illustrated in FIG. 13.

In the event location is to be determined in a threedimensional arrangement, an additional transmitting station, constructed similarly to the transmitting stations shown in FIG. 13, could be provided, the receiving station illustrated in FIG. 14 being provided with an additional channel. Alternatively, an altimeter device, as generally illustrated in FIG. 1C, could be used to determine location in a third dimension.

Figure 15:
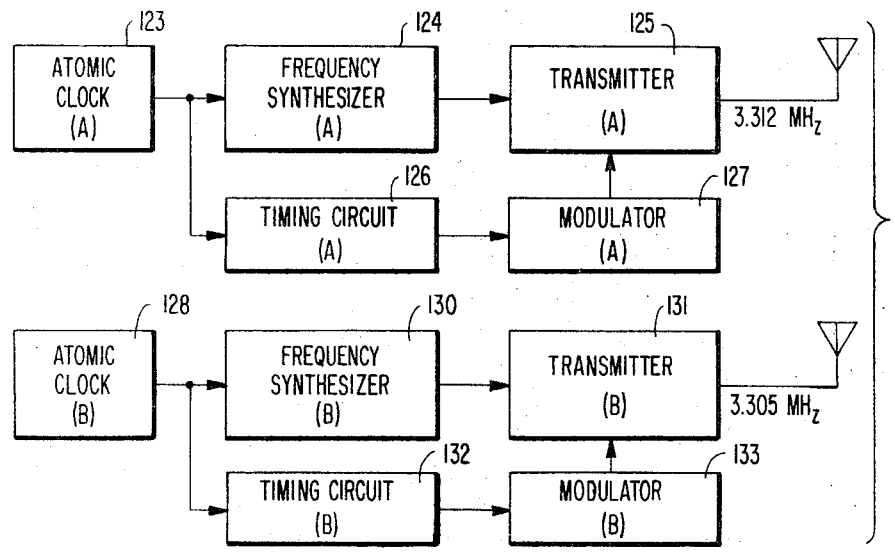
FIG. 15 is a simplified block diagram of illustrative embodiments of two transmitter stations according to the invention.

In FIG. 15 a simplified block diagram of two transmitting stations, particularly useful in illustrating a position locating system in which a heterodyne principle is used at the receiving station, is shown. In a three-dimensional arrangement, such as illustrated in FIGS. 1B and 1D, an additional transmitting station would, of course, be provided.

One of the transmitting stations (A) shown in FIG. 15, designed as illustrated to transmit a 3.312 MHz signal, includes an atomic clock 123 which provides a fixed frequency input to a frequency synthesizer 124. The frequency synthesizer 124 is designed to reduce the high frequency input signal from the atomic clock 123 to a signal having the selected 3.312 MHz frequency which is fed to a transmitter 125. The transmitter 125 has an antenna (unnumbered) from which a modulated radio signal of 3.312 Mhz is radiated.

The atomic clock 123 also supplies an input to a timing circuit 126, which may take the form of a frequency synthesizer and pulse timer, its output being applied to a modulator 127. The modulator 127 may be operative either to amplitude modulate, to notch modulate, to frequency modulate, to frequency shift key, or to pulse the transmitter 125.

The other of the transmitting stations (B) illustrated in FIG. 15, designed as shown to transmit a 3.305 MHz signal, includes an atomic clock 128 which has the same frequency as the atomic clock 123. The atomic clock 128 provides a fixed frequency input to a frequency synthesizer 130. The frequency synthesizer 130 is designed to reduce the high frequency input signal from the atomic clock 128 to a signal having the selected 3.305 MHz frequency which is fed to a transmitter 131. The transmitter 131 has an antenna (unnumbered) from which a modulated radio signal of 3.305 MHz is radiated.

The atomic clock 128 also supplies an input to a timing circuit 132, which may comprise a frequency synthesizer and pulse timer, its output being supplied as the input to a modulator 133. The modulator 133 may be operative either to amplitude modulate, to notch modulate, to frequency modulate, to frequency shift key, or to pulse the transmitter 131.

Figure 16:
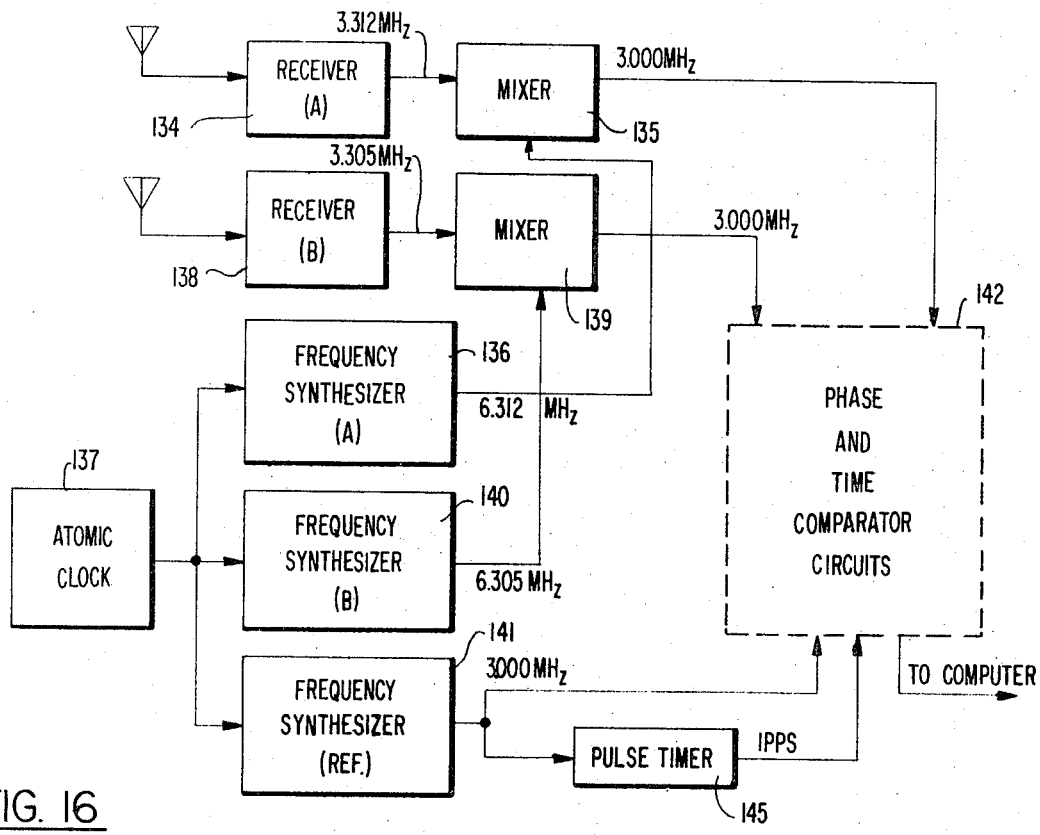
FIG. 16 is a simplified block diagram of an illustrative embodiment of a portion of a receiving station usable in a preferred embodiment of the system in which a heterodyne principle is used.

As shown in FIG. 16, a receiving station suitable for receiving and using the signals transmitted by the two transmitting stations illustrated in FIG. 15 includes a receiver 134 for receiving and amplifying a 3.312 MHz signal which is fed as one input to a non-linear mixer 135 arranged to receive its second input, illustrated as a 6.312 MHz signal, from a frequency synthesizer 136. The frequency synthesizer 136 receives its controlling input from an atomic clock 137 having the same frequency as the atomic clock 123 (FIG. 15).

The receiving station show in FIG. 16 further includes a receiver 138 for receiving and amplifying a 3.305 MHz signal which is fed as a first input to a non-linear mixer 139 arranged to receive its second input, shown as a 6.305 MHz signal, from a frequency synthesizer 140. The frequency synthesizer 140, like the frequency synthesizer 136, is provided with an input from the atomic clock 137 and is effective to reduce the signal received therefrom to the desired frequency, illustrated as the 6.305 MHz signal.

A third frequency synthesizer 141 also is arranged to receive an input from the atomic clock 137 and is effective to reduce the frequency to a reference frequency, illustrated as a 3.000 MHz signal.

Thus, each of the mixers 135 and 139, and the frequency synthesizer 141 produce a separate and distinct signal having the predetermined frequency illustrated as 3.000 MHz. The three 3.000 MHz signals are fed to phase and time comparator circuits, referred to generally by the numeral 142, which are effective to compare the phase of each of the two 3.000 MHz signals from the non-linear mixers 135 and 139 with that of the 3.000 MHz signal received from the frequency synthesizer 141.

Outputs from the phase and time comparator circuits 142, resulting from the phase comparisons mentioned in the preceding paragraph, represent fine distance data in the form of signals which are supplied to a computer (not shown in FIG. 16), such as the computer 27 shown in each of FIGS. 3 and 4.

As illustrated in FIG. 16, the receiving station includes a pulse timer 145 supplied with a 3.000 MHz input signal from the frequency synthesizer 141 and operative to produce a train of pulses, illustrated as having a pulse repetition rate of one-pulse-per-second, which constitutes reference time pulses. The reference time pulses from the pulse timer 145 are compared with demodulated time pulses recovered by demodulators (not illustrated) forming parts of the phase and time comparator circuits indicated generally by the numeral 142, the demodulators being effective to recover the time signals carried by the signals received by the receivers 134 and 138. Alternatively, the demodulators could form parts of the receivers 134 and 138.

Outputs from the phase and time comparator circuits 142, resulting from the comparisons mentioned in the preceding paragraph, represent coarse distance data in the form of signals which are supplied to the computer (not shown in FIG. 16), such as the computer 27 shown in each of FIGS. 3 and 4.

While only two channels are specifically illustrated in FIG. 16, it is understood for a three dimensional system, as shown by way of example in FIGS. 1B and 1D, an additional channel for receiving modulated signals from a third transmitting station, shown generally at D in FIGS. 1B and 1D, would be required.

The phase and time comparator circuit 142 (FIG. 16) may include either plural phase comparison circuits or a single multiplexed phase comparator, and either a single pulse time comparator which cooperates with a multiplexer, or plural time comparators.

Figure 17:
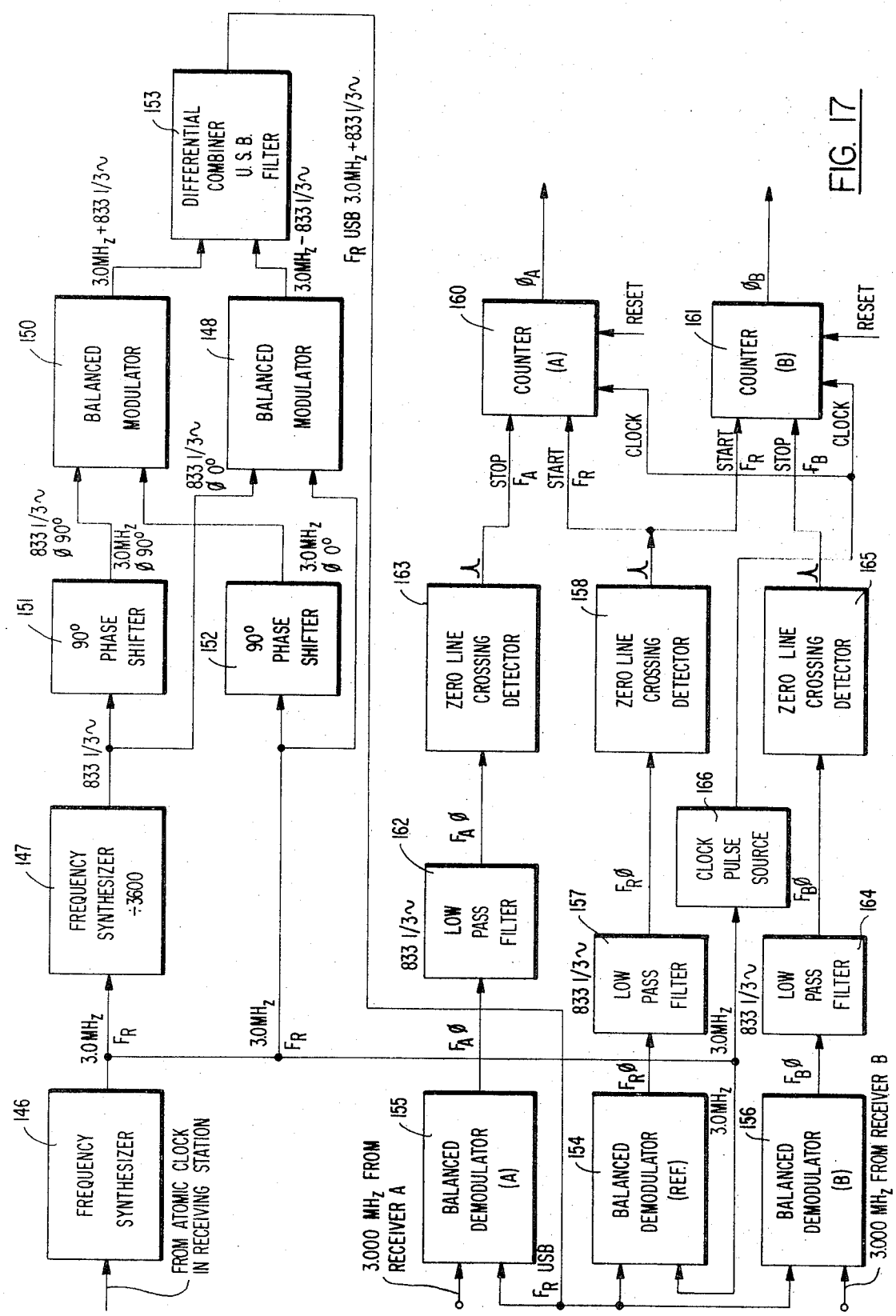
FIG. 17 is a block diagram of an illustrative embodiment of a phase comparator usable in a locked heterodyne apparatus forming part of the portion of the receiving station shown in FIG. 16.

Referring to FIG. 17, a highly accurate digital phase comparator using balanced modulators and demodulators is illustrated. As shown, the phase comparator is particularly suitable for use in a two receiver phase locked heterodyne receiving station, such as is illustrated in FIG. 16, for developing fine distance data in the form of digital signals suitable for processing in a digital computer.

The phase comparator shown in FIG. 17 includes a frequency synthesizer 146 which receives its input from an atomic clock (not illustrated) such as the atomic clock 137 (FIG. 16). The frequency synthesizer 146 effectively reduces the high frequency input it receives from the atomic clock (not illustrated) to a 3.000 MHz signal $F_R$ which is fed to a frequency synthesizer 147. The frequency synthesizer 147 divides the 3.000 MHz signal by a factor of 3,600 producing, as its output, a signal having a frequency of 833 ⅓ cycles per second which is fed directly as one input to a balanced modulator 148.

The 833 ⅓ cycle signal from the frequency synthesizer 147 is also fed, as one input, to a balanced modulator 150 via a 90° phase shifter 151. The balanced modulator 150 receives, as its second input, the 3.000 MHz signal from the frequency synthesizer 146 via a 90° phase shifter 152.

The balanced modulator 150 processes the 90° phase shifted 833 ⅓ cycle signal and the 90° phase shifted 3.000 MHz signal producing, in well known manner, a 3.000 MHz + 833 ⅓ cycle output signal which is supplied as one input to a differential combiner and upper side band filter 153.

The balanced modulator 148 receives, as its second input, the 3.000 MHz signal directly from the frequency synthesizer 146. The balanced modulator 148 processes the zero phase shifted 833 ⅓ cycle signal and the zero phase shifted 3.000 MHz signal, producing a 3.000 MHz − 833 ⅓ cycle output signal which is supplied as a second input to the differential combiner and upper side band filter 153.

The differential combiner and upper side band filter 153 is operative to produce, as its output, an upper side band signal of 3.000 MHz + 833 ⅓ cycles, designated $F_R$ USB, which is fed as one input to three balanced demodulators 154, 155 and 156.

The balanced demodulator 154 is provided with a 3.000 MHz signal, as its second input, directly from the frequency synthesizer 146 and produces as its useful output an 833 ⅓ cycle signal, designated $F_R \phi$, which is passed via a low pass filter 157, which removes any undesirable high frequency signals, to a zero line crossing detector 158. The zero line crossing detector 158 produces a train of pulses representing zero line crossings, for example negative-to-positive line crossings, of the 833 ⅓ cycle signal $F_R \phi$. The train of pulses produced by the zero line crossing detector 158 is applied to the START input terminal of a counter 160 and to the START input terminal of a counter 161.

The balanced demodulator 155 receives, as its second input, a 3.000 MHz signal from a receiver or mixer (not illustrated) such as the mixer 135 (FIG. 16) and produces as its useful output an 833 ⅓ cycle signal, designated $F_A \ominus$, which is coupled via a low pass filter 162, which removes undesirable high frequency signals, to a zero line crossing detector 163. The zero line crossing detector 163 produces a train of pulses representing zero line crossings, for example negative-to-positive line crossings, of the 833 ⅓ cycle signal $F_A \phi$. The train of pulses produced by the zero line crossing detector 163 is applied to the STOP input terminal of the counter 160.

The balanced demodulator 156 receives, as its second input, a 3.000 MHz signal from a receiver or mixer (not illustrated) such as the mixer 139 (FIG. 16) and produces as its useful output an 833 ⅓ cycle signal, designated $F_B \phi$, which is coupled, via a low pass filter 164, which removes any high frequency signals, to a zero line crossing detector 165. The zero line crossing detector 165 produces a train of pulses representing zero line crossings, for example negative-to-positive line crossings, of the 833 ⅓ cycle signal $F_B \phi$. The train of pulses produced by the zero line crossing detector 165 is applied to the STOP input terminal of the counter 161.

Each of the counters 160 and 161 is supplied with a CLOCK input from a clock pulse source 166 which produces a train of pulses of given selected repetition rate under control of the 3.000 MH$_Z$ $F_R$ signal which is supplied to the clock pulse source 166 from the frequency synthesizer 146 as a synchronizing input.

As shown in FIG. 17, each of the counters 160 and 161 is provided with a RESET input terminal. If desired, the RESET function could be provided internally in each of the counters 160 and 161, resetting occurring a given time after receipt of a STOP signal or upon receipt of a first CLOCK pulse subsequent to receipt of a STOP pulse. Alternatively, RESET pulses for application to the RESET terminals of the counters 160 and 161 could be developed by an external RESET pulse source which could be controlled and synchronized by the 3.000 MH$_Z$ $F_R$ signal from the frequency synthesizer 146.

Since the three 833 ⅓ cycle signals $F_A \phi$, $F_B \phi$ and $F_R \phi$ are derived from atomic clocks, two positioned at transmitting station locations and one positioned at a receiving station location, their absolute phases are predetermined. The phase difference between $F_A \phi$ and $F_R \phi$ represents the fine distance, in terms of signal propagation time, a transmitting station, for example transmitting station A in FIGS. 1A–1D, is from the receiving station, within a given lane, for example receiving station C in FIGS. 1A–1D. Similarly, the phase difference between $F_B \phi$ and $F_R \phi$ represents the fine distance transmittting station B (FIGS. 1A–1D), within a given lane, is from the receiving station C (FIGS. 1A–1D).

The count outputs, designated $\phi_A$ and $\phi_B$, from the two counters 160 and 161 represent respectively the fine distance, that is distance within a single lane, the transmitting stations A and B (FIGS. 1A–1D) are from the receiving station C (FIGS. 1A–1D). The count output signals $\phi_A$ and $\phi_B$ from the counters 160 and 161, in practice, would be supplied to a computer, such as the computer 27 shown in FIGS. 3 and 4, which would convert the count output signals into units of distance.

While only two channels, A and B, have been illustrated in FIG. 17, it will be appreciated that the digital phase comparator shown could be provided with an additional channel, if desired, for adapting it to a three-dimensional arrangement, such as illustrated in FIG. 1B and FIG. 1D.

As shown in FIG. 17, separate counters 160 and 161 are provided; however, a single counter fed from a multiplexer could be used, the multiplexer receiving its output from the zero line crossing detectors 163 and 165.

It will be appreciated that the phase determining units 232 and 233 (FIG. 14) could be constructed similarly to the combination of the low pass filters 157, 162 and 164, zero line crossing detectors 158, 163 and 165, and the counters 160 and 161, as illustrated in FIG. 17.

Figure 18:
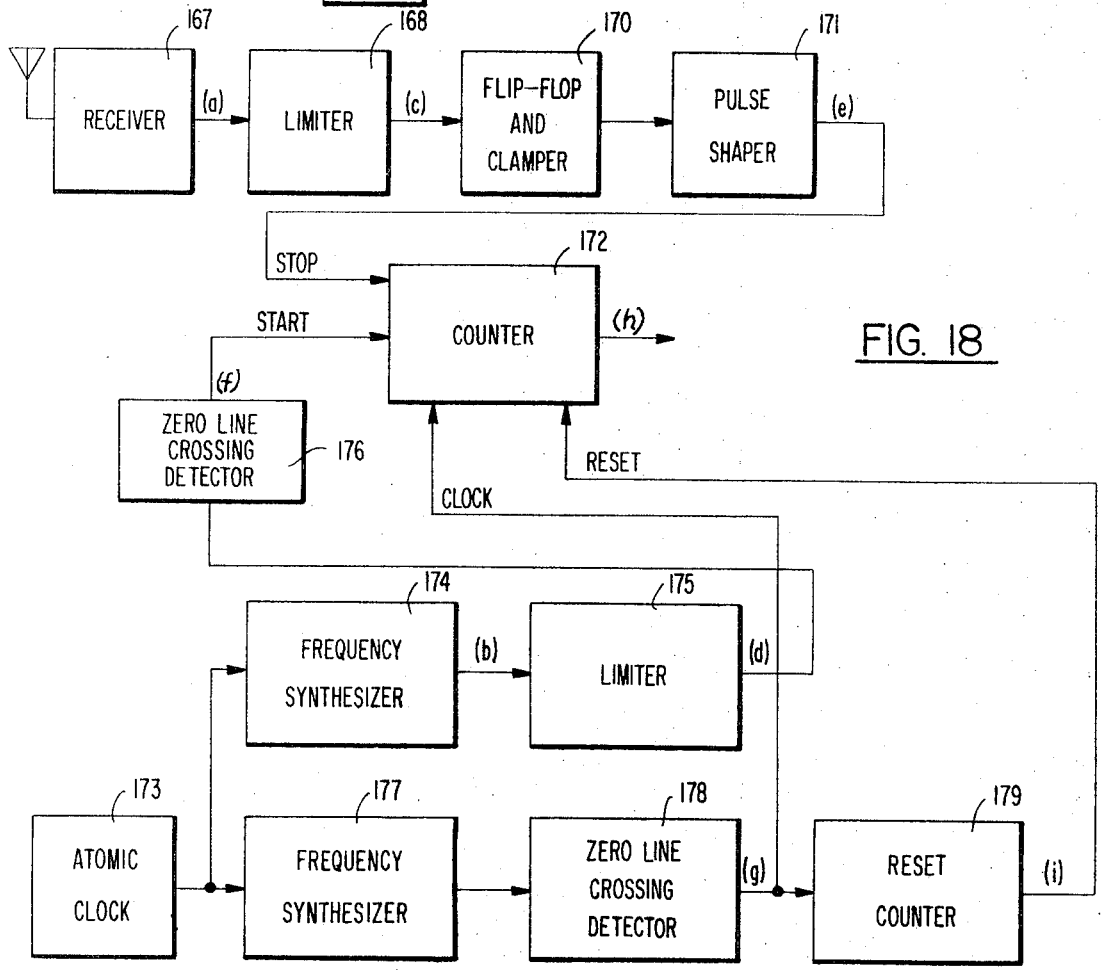
FIG. 18 is a simplified block diagram of an embodiment of a preferred phase comparator for developing fine distance data usable as part of the receiving station.

Referring to FIG. 18, the details of construction of a very accurate phase comparator, particularly suitable for use as a phase comparator for developing fine distance data, are described below, reference being made to the waveforms illustrated in FIG. 19.

The phase comparator, as shown in FIG. 18, is associated with a receiver 167 which receives and amplifies a radio signal from a transmitting station, such as one of the transmitting stations A, B and D (FIGS. 1A–1D). The amplified radio signal, shown as waveform ($a$) in FIG. 19, from the receiver 167 is coupled to a squaring amplifier or limiter 168. The limiter 168 produces an output signal in the form of a square wave, shown as waveform ($c$) in FIG. 19, which is fed to a flip-flop and clamper 170. An output from the flip-flop and clamper 170 is processed by a pulse shaper 171 which produces a pulse output, shown as waveform ($e$) in FIG. 19, which indicates the exact point waveform ($a$) makes a negative-to-positive crossing. As shown, the waveform ($a$) makes a negative-to-positive crossing at 90° on the time base shown. It is to be understood that the actual point of crossing, relative to a reference signal, shown as waveform ($b$) in FIG. 19, depends on the transmission time of the radio signal received by the receiver 167 from a transmitting station.

Figure 19:
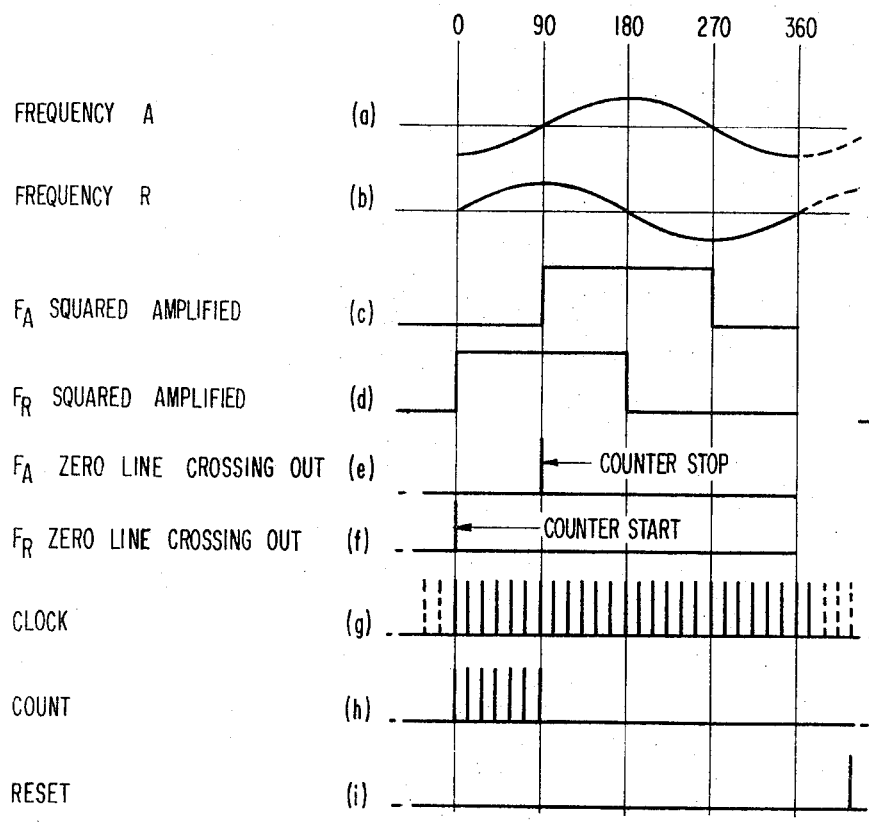
FIG. 19 shows a number of waveforms which are useful in understanding the operation of the phase comparator illustrated in FIG. 18.

The pulse output, waveform ($e$) in FIG. 19, from the pulse shaper 171 is fed to the STOP input terminal of a counter 172.

The phase comparator includes an atomic clock 173 which provides an input to a frequency synthesizer 174. The frequency synthesizer 174 effectively reduces the frequency of the signal it receives to the identical frequency of the radio signal received by the receiver 167, providing as its output a reference radio frequency signal, illustrated as waveform ($b$) in FIG. 19, having a fixed phase.

The output reference radio frequency signal from the frequency synthesizer 174 is fed to a squaring amplifier or limiter 175. The limiter 175 produces an output signal in the form of a square wave, shown as waveform ($d$) in FIG. 19. The output square wave signal from the limiter 175 is fed to a zero line crossing detector 176 which produces a pulse output, shown as waveform ($f$) in FIG. 19, for each negative-to-positive zero crossing of the reference radio frequency signal, shown as waveform ($b$) in FIG. 19.

An output from the atomic clock 173 is fed to a frequency synthesizer 177 which effectively reduces the frequency to a lower frequency, providing as its output signal, a radio frequency signal having a frequency considerably higher than the reference radio frequency signal produced by the frequency synthesizer 174.

The radio frequency signal from the frequency synthesizer 177 is coupled to a zero line crossing detector 178 which produces, as its output signal, a train of pulses, illustrated as waveform ($g$) in FIG. 19, each pulse representing a negative-to-positive zero line crossing of the radio frequency signal supplied from the frequency synthesizer 177.

The train of pulses, shown as waveform ($g$) in FIG. 19, from the zero line crossing detector 178 is fed as a clocking input to the CLOCK terminal of the counter 172. The train of pulses, from the zero line crossing detector 178, is also coupled as an input to a reset counter 179 which generates a single pulse output, shown as waveform (*i*) in FIG. 19, upon receipt of a predetermined number of input pulses. The single pulse output from the reset counter 179 is coupled to the RESET terminal of the counter 172.

An output signal, illustrated as a count in waveform (*h*) in FIG. 19, from the counter 172 represents, with a very high degree of accuracy, the phase difference between the two signals shown as waveforms (*a*) and (*b*) in FIG. 19. The output signal (count) from the counter 172 could be fed to a computer, such as the computer 27 shown in FIGS. 3 and 4, which, in turn, would convert the signal into distance data.

While only one channel is shown in FIG. 18, it will be appreciated that in a practical two-dimensional position locating system (FIGS. 1A and 1C) a receiving station would be equipped with an additional channel. In a practial three-dimensional position locating system (FIGS. 1B and 1D) a receiving station would be equipped with two additional channels. As with the phase comparator illustrated in FIG. 17, the phase comparator shown in FIG. 18 when modified and adapted for multichannel use could include a multiplexer.

In some applications, the transmitting stations could be arranged to transmit on a time sharing basis, all transmitting stations using the same frequency. Demultiplexing techniques would be used at the receiving station for sorting the received signals or signals derived therefrom.

Although the present invention has been illustrated as having a moving receiving station and two or three fixed transmitting stations, it will be appreciated that the receiving station could be fixed and one of the transmitting stations moving. In some special applications all of the stations could be moving.

While the present invention has been illustrated as one in which the signal outputs from phase comparators and pulse time comparators are digital, the outputs from these units could, if desired, be made analog in which case the analog outputs could be combined in a network, servo system, or the like. For the sake of accuracy, however, the outputs from the phase comparators are desirably digital.

The present invention is highly accurate and serves to eliminate lane ambiguity without the need to be operating at all times or accumulating lanes as, for example, when a vessel carrying the receiving station leaves shore and proceeds to sea.

The atomic clocks used in the present invention may be provided by cesium beam tubes as the tube forming part of a Hewlett-Packard cesium beam frequency standard sold under model number 5061A. The transmitters and receivers may be of various constructions, and should be extremely stable. The computer used may be, for example, a Control Data Corporation 5100 system or a Control Data Corporation 469 system, the latter being particularly suitable for use in aircraft.

It will be appreciated that many variations of the present invention are possible, and the foregoing detailed description relates only to illustrative embodiments. It is to be understood that various changes may be made by those skilled in the art within the principle and scope of the invention as expressed in the appended claims.

1. A transmitting station in a position locating system in which both transmitted radio signals and modulation signals carried thereon are utilized to locate accurately a position and have a fixed phase-time relationship to one another, said transmitting station comprising: a radio transmitter; a radiating means coupled to said transmitter; a stable source of oscillations in the form of a frequency standard; means controlled by said source of oscillations for supplying a stable radio frequency signal to said transmitter, which stable radio frequency signal provides in its phase as received at a distant point a basis for developing fine distance datum; and modulating means controlled by said source of oscillations for modulating said transmitter with at least one signal, which signal provides a basis for developing, at a distant point, coarse distance datum.

2. A transmitting station as claimed in claim 1 wherein said source of oscillations comprises an atomic clock.

3. A radio transmitting station as claimed in claim 1 wherein said modulating means comprises an amplitude modulator.

4. A radio transmitting station as claimed in claim 1 wherein said modulating means comprises a notch modulator.

5. A radio transmitting station as claimed in claim 1 wherein said modulating means comprises a frequency shift modulator.

6. A radio transmitting station as claimed in claim 1 wherein said modulating means comprises a pulse modulator.

7. A radio transmitting station as claimed in claim 1 wherein said modulating means comprises a frequency modulator.

8. A radio transmitting station as claimed in claim 7 including means for supplying the frequency modulator with a modulating signal from means controlled by said source of oscillations, and including a timing circuit means controlled by said source of oscillations for supplying a control signal to said frequency modulator.

9. A radio transmitting station as claimed in claim 1 including a driver which has its input coupled to said source of oscillations via a frequency synthesizer and its output coupled to said transmitter.

10. A radio transmitting station as claimed in claim 1 wherein said modulating means has its input coupled to a source of time signals; and including a frequency synthesizer having an input and an output, said source of time signals having its input coupled to the output from the frequency synthesizer, and the input to said frequency synthesizer being coupled to said source of oscillations.

11. A radio transmitting station as claimed in claim 3 wherein said source of oscillations comprises an atomic clock.

12. A radio transmitting station as claimed in claim 4 wherein said source of oscillations comprises an atomic clock.

13. A radio transmitting station as claimed in claim 5 wherein said source of oscillations comprises an atomic clock.

14. A transmitting station as claimed in claim 6 wherein said source of oscillations comprises an atomic clock.

* * * * *